(12) United States Patent
Shreevastav et al.

(10) Patent No.: US 12,261,788 B2
(45) Date of Patent: Mar. 25, 2025

(54) METHOD FOR DYNAMIC CONFIGURATION OF REFERENCE SIGNAL

(71) Applicant: TELEFONAKTIEBOLAGET LM ERICSSON (PUBL), Stockholm (SE)

(72) Inventors: Ritesh Shreevastav, Upplands Väsby (SE); Åke Busin, Sollentuna (SE); Sara Modarres Razavi, Linköping (SE); Iana Siomina, Täby (SE); Satyam Dwivedi, Solna (SE); Fredrik Gunnarsson, Linköping (SE); Deep Shrestha, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 875 days.

(21) Appl. No.: 17/265,728

(22) PCT Filed: Aug. 2, 2019

(86) PCT No.: PCT/IB2019/056620
§ 371 (c)(1),
(2) Date: Feb. 3, 2021

(87) PCT Pub. No.: WO2020/026211
PCT Pub. Date: Feb. 6, 2020

(65) Prior Publication Data
US 2021/0297216 A1 Sep. 23, 2021

Related U.S. Application Data

(60) Provisional application No. 62/714,528, filed on Aug. 3, 2018.

(51) Int. Cl.
*H04W 4/029* (2018.01)
*G01S 1/04* (2006.01)
(Continued)

(52) U.S. Cl.
CPC .......... *H04L 5/0048* (2013.01); *G01S 1/0428* (2019.08); *G01S 1/20* (2013.01); *H04W 4/029* (2018.02)

(58) Field of Classification Search
CPC ..... H04W 28/04; H04W 72/04; H04W 72/12; H04W 84/045; H04W 4/029; H04W 64/00
(Continued)

(56) References Cited

U.S. PATENT DOCUMENTS

| | | | | |
|---|---|---|---|---|
| 2012/0243503 A1* | 9/2012 | Mochida | ............... | H04W 28/04 370/329 |
| 2014/0349677 A1* | 11/2014 | Xiao | ..................... | G01S 5/0215 455/456.1 |

(Continued)

FOREIGN PATENT DOCUMENTS

| | | |
|---|---|---|
| CN | 101616360 A | 5/2012 |
| CN | 102884749 A | 1/2013 |

(Continued)

OTHER PUBLICATIONS

Ericsson, Richer RSTD reporting for indoor positioning, R1-163978, 3GPP TSG RAN WG1 Meeting #85, Nanjing, China, May 23-27, 2016.

(Continued)

*Primary Examiner* — Joseph Arevalo
(74) *Attorney, Agent, or Firm* — Ericsson Inc.

(57) ABSTRACT

A method for positioning reference signal configuration comprises receiving, from a network node, one or more first positioning reference signals in a first PRS configuration; performing one or more first measurements on the first PRS to determine one or more first characteristics of the one or more first PRSs; sending, to the network node, a second PRS configuration determined based on the one or more first characteristics; receiving, from the network node, a third PRS configuration, wherein the third PRS configuration comprises one or more third PRSs having at least one different signal characteristic than the one or more first characteristics of the first PRS; and performing one or more second measurements on the one or more third PRSs. The method provides a dynamic configuration for PRS based on the feedback from the UE and a location node, beamforming configuration, or any requirements for physical layer efficiently.

26 Claims, 27 Drawing Sheets

(51) Int. Cl.
  *G01S 1/20* (2006.01)
  *H04L 5/00* (2006.01)
(58) Field of Classification Search
  USPC .................. 370/329, 252, 330, 344, 311
  See application file for complete search history.

(56) References Cited

U.S. PATENT DOCUMENTS

| | | | | |
|---|---|---|---|---|
| 2015/0296359 | A1* | 10/2015 | Edge ..................... | G01S 1/0428 |
| | | | | 455/404.2 |
| 2015/0365790 | A1 | 12/2015 | Edge et al. | |
| 2016/0205717 | A1* | 7/2016 | Kazmi ................. | H04W 76/15 |
| | | | | 455/435.2 |
| 2019/0053280 | A1* | 2/2019 | Rico Alvarino .... | H04W 64/003 |
| 2019/0327706 | A1* | 10/2019 | Agnihotri ............. | H04W 24/10 |
| 2019/0327707 | A1* | 10/2019 | Agnihotri ................. | G01S 5/10 |

FOREIGN PATENT DOCUMENTS

| | | |
|---|---|---|
| CN | 106415300 A | 2/2017 |
| CN | 107925496 A | 9/2019 |
| EP | 3541126 A1 | 9/2019 |
| JP | 2017525195 A | 8/2017 |
| WO | 2017030488 W | 2/2017 |
| WO | 2017173033 W | 10/2017 |
| WO | 2018086495 A1 | 5/2018 |

OTHER PUBLICATIONS

Ericsson, Co-ordination among UE, gNB and Location Server for PRS Configuration, R1-1901200, 3GPP TSG RAN WG1 Ad-Hoc Meeting 1901, Taipei, Taiwan, Jan. 21-25, 2019.

* cited by examiner

Cell 1:

Cell 2:

Cell 3:

METHOD FOR DYNAMIC CONFIGURATION OF REFERENCE SIGNAL

This application is a 371 of International Application No. PCT/IB2019/056620, filed Aug. 2, 2019, which claims the benefit of U.S. Application No. 62/714,528, filed Aug. 3, 2018, the disclosures of which are fully incorporated herein by reference.

TECHNICAL FIELD

Particular embodiments relate to the field of signaling configuration; and more specifically, to methods, and apparatus for a dynamic configuration of reference signal.

BACKGROUND

In LTE, positioning has been a major topic in standardization since 3GPP Release 9. The primary objective is to fulfill regulatory requirements for positioning an emergency call. In FIG. 1, positioning in New Radio (NR) is proposed to be supported by the architecture disclosed in NG-RAN Release 15 location services (LCS) protocols. In FIG. 1, gNB and ng-eNB may not always both be present. When both of the gNB and the ng-eNB are present, the NG-C interface is only present for one of them. LMF is the location node in NR. There are also interactions between the location node and the gNodeB via the NRPPa protocol. The interactions between the gNodeB and the device is supported via the Radio Resource Control (RRC) protocol.

In the legacy LTE standards, the following techniques are supported, such as, enhanced cell ID, assisted Global Navigation Satellite System (GNSS), observed time difference of arrival (OTDOA), and uplink TDOA (UTDOA).

Regarding enhanced cell ID, essentially, cell ID information is used to associate the device to the serving area of a serving cell, and then additional information is used to determine a finer granularity position.

Regarding assisted GNSS, GNSS information retrieved by the device, supported by assistance information provided to the device from evolved serving mobile location center (E-SMLC).

Regarding OTDOA, the device estimates the time difference of reference signals from different base stations and sends to E-SMLC for multi-lateration.

Regarding UTDOA, the device is requested to transmit a specific waveform that is detected by multiple location measurement units (e.g. an eNB) at known positions. These measurements are forwarded to the E-SMLC for multi-lateration.

According to the NR positioning study items agreed for Release 16, the 3GPP NR radio-technology is uniquely positioned to provide added value in terms of enhanced location capabilities. The operation in low and high frequency bands (i.e. below and above 6 GHz) and the utilization of massive antenna arrays provides additional degrees of freedom to substantially improve the positioning accuracy. The possibility to use wide signal bandwidth in low, and especially in high bands, brings new performance bounds for user location for well-known positioning techniques based OTDOA and UTDOA, Cell-ID or E-Cell-ID etc., utilizing timing measurements to locate UE. The recent advances in massive antenna systems (e.g. massive MIMO) provides additional degrees of freedom to enable more accurate user location by exploiting spatial and angular domains of propagation channel in combination with time measurements.

As 3GPP Release 9 Positioning Reference Signals (PRSs) have been introduced for antenna port 6, the Release 8 cell-specific reference signals are not sufficient for positioning. The simple reason is that the required high probability of detection could not be guaranteed. A neighbor cell with its synchronization signals (e.g. primary synchronization signals and secondary synchronization signals) and reference signals is seen as detectable, when the Signal-to-Interference-and-Noise Ratio (SINR) is at least −6 dB. Simulations during standardization have shown for second best-detected neighboring cell, which means that this can only guarantee for 70% of all cases for the third best-detected neighboring cell. This is not enough and has been assumed an interference-free environment, which cannot be ensured in a real-world scenario. However, the PRSs still have some similarities with cell-specific reference signals as defined in 3GPP Release 8. It is a pseudo-random Quadrature Phase Shift Keying (QPSK) sequence that is being mapped in diagonal patterns with shifts in frequency and time, to order to avoid collision with cell-specific reference signals and an overlap with the control channels (e.g. PDCCH).

There currently exist certain challenge(s). For example, in LTE, the PRS configuration is static and cannot be tuned specific to certain environment need. The PRS configuration cannot be made user-specific and cannot be made beam-specific within a cell. Moving forward to NR, it may be desirable to cater different radio propagation characteristics and UE movement as an input to provide a PRS configuration efficiently.

SUMMARY

To address the foregoing problems with existing solutions, disclosed are methods, a user equipment (UE), and a network node, to provide a dynamic configuration for reference signals. The present disclosure implements a solution to configure positioning reference signals (PRSs) adaptively to UE movement, beamforming configuration, and other physical aspects by sending information element which includes characteristics of PRSs between the UE and network nodes. Furthermore, the network node determines an updated configuration based on the characteristics of PRSs. By performing measurements on the received characteristics of PRSs, the methods disclosed herein may provide a customized PRS configuration for each UE, and therefore, improve a utilization of resource.

Several embodiments are elaborated in this disclosure. According to one embodiment of a method for PRS configuration, the method comprises receiving, from a network node, one or more first PRSs in a first PRS configuration. The method further comprises performing one or more first measurements on the one or more first PRSs to determine one or more first characteristics of the one or more first PRSs. The method additionally comprises sending, to the network node, a second PRS configuration comprising one or more second PRSs determined based on the one or more first characteristics of the one or more first PRSs. The method yet further comprises receiving, from the network node, a third PRS configuration. The third PRS configuration comprises one or more third PRSs having at least one different signal characteristic than the one or more first characteristics of the first PRS. The method further comprises performing one or more second measurements on the one or more third PRSs.

In one embodiment, the first measurements and the second measurements comprise estimates of one or more time of arrivals for the first PRSs and the third PRSs respectively.

In one embodiment, the third PRS configuration is received via broadcast, multicast, or dedicated signaling, or via on-demand system information broadcast.

In one embodiment, the method further comprises determining one or more third characteristics of the one or more third PRSs based on the second PRS configuration.

In one embodiment, the method further comprises sending, to the network node, a request message. The request message comprises a request for an additional PRS which is configured for one or more subframes in transmission. The method further comprises receiving, from the network node, the additional PRS determined based on the third PRS configuration. In one embodiment, the additional PRS is allocated with a bandwidth to avoid an overlap with another PRSs.

In one embodiment, the network node is a base station or a location node.

According to another embodiment of a method for PRS configuration, the method comprises sending, to a UE, one or more first PRS configuration comprising one or more first PRSs. The method further comprises receiving, from the UE, a second PRS configuration comprising one or more second PRSs determined based on the one or more first PRSs of the first PRS configuration. The method additionally comprises performing a set of measurements on the one or more second PRSs of the second PRS configuration. The method further comprises sending, to the UE, a third PRS configuration. The third PRS configuration comprises at least one PRS having a different signal characteristic than the one or more first PRSs of the first PRS configuration.

In one embodiment, the method further comprises receiving one or more cross correlation factors in the one or more second PRSs, and prioritizing one or more measurements related to one or more cross correlation factors which are higher than a threshold from the set of measurements. In another embodiment, the method further comprises discarding one or more measurements related to one or more cross correlation factors which are lower than the threshold from the set of measurements.

In one embodiment, the method further comprises identifying cells which have one or more cross correlation factors higher than a threshold, and allocating bandwidth to the identified cells.

In one embodiment, the method further comprises allocating bandwidth for the third PRS configuration. In one embodiment, the bandwidth is allocated to minimize an overlap from interfering neighboring cells. In another embodiment, the bandwidth is allocated to avoid an overlap in time and frequency with another PRSs.

In one embodiment, the second PRS configuration is received via broadcast, multicast, or dedicated signaling, or via on-demand system information broadcast.

In one embodiment, the network node is a base station or a location node.

According to an embodiment of a UE for PRS configuration, the UE comprises at least one processing circuitry and at least one storage that stores processor-executable instructions, when executed by the processing circuitry, causes the UE to receive, from a network node, one or more first PRSs in a first PRS configuration. The UE further performs one or more first measurements on the one or more first PRSs to determine one or more first characteristics of the one or more first PRSs. The UE additionally sends, to the network node, a second PRS configuration comprising one or more second PRSs determined based on the one or more first characteristics of the one or more first PRSs. The UE yet further receives, from the network node, a third PRS configuration. The third PRS configuration comprises one or more third PRSs having at least one different signal characteristic than the one or more first characteristics of the first PRS. The UE further performs one or more second measurements on the one or more third PRSs.

According to an embodiment of a network node for PRS configuration, the network node comprises at least one processing circuitry, and at least one storage that stores processor-executable instructions, when executed by the processing circuitry, causes a network node to send, to a UE, one or more first PRS configuration comprising one or more first PRSs. The network node further receives, from the UE, a second PRS configuration comprising one or more second PRSs determined based on the one or more first PRSs of the first PRS configuration. The network node additionally performs a set of measurements on the one or more second PRSs of the second PRS configuration. The network node further sends, to the UE, a third PRS configuration. The third PRS configuration comprises at least one PRS having a different signal characteristic than the one or more first PRSs of the first PRS configuration.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may provide an efficient solution to customize a PRS configuration for each UE based on an environment near the UE and a movement of the UE, such that a location node or a base station avoids assigning bandwidth which interferes neighboring cells or overlaps with another PRSs. Therefore, particular embodiments may utilize the resource in the network efficiently, and then further improve the performance of the network.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Positioning reference signals (PRSs) in legacy LTE standardization are not sufficient to provide an accurate positioning. Due to a high requirement of detecting interference and insufficient resources for neighboring cells, a user equipment (UE) is often provided with a PRS configuration comprising PRSs which might collide with other reference signals or be interfered by neighboring cells. Particular embodiments of the present disclosure provide the UE a dynamic PRS configuration by updating feedback to a location node. Furthermore, the location node may request a PRS configuration from a radio node which serves the target UE and possibly from neighboring radio nodes, so that the radio node may allocate PRS for the target UE with proper bandwidth to avoid interference from neighboring cells.

Particular embodiments of the present disclosure focus on physical reference signals for positioning similar to those defined for PRSs in LTE. Therefore, the present disclosure is valid for other existing NR physical reference signals, such as Channel State Information Reference Signal (CSI-RS), Timing Reference Signal (TRS), TPRS, NR reference signals defined for positioning purpose (NR PRS), and the like. NR PRS configuration similar to LTE would compromise a number of consecutive subframes for PRS transmission, PRS occasion, muting pattern, PRS hoping, bandwidth, and/or cell ID parameters as specified in TS 36.355. Furthermore, in terms of NR, particular embodiments of the present disclosure are extended to contain beam information and PRS in terms of a PRS resource set.

In the present disclosure, Es may be used to refer to the received energy per resource unit (e.g. power normalized to the subcarrier spacing) during the useful part of the symbol, i.e. excluding the cyclic prefix, at the UE antenna connector. In the present disclosure, Iot may be used to refer to the received power spectral density of the total noise and interference for a certain resource unit (e.g. power integrated over the RE and normalized to the subcarrier spacing) as measured at the UE antenna connector.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
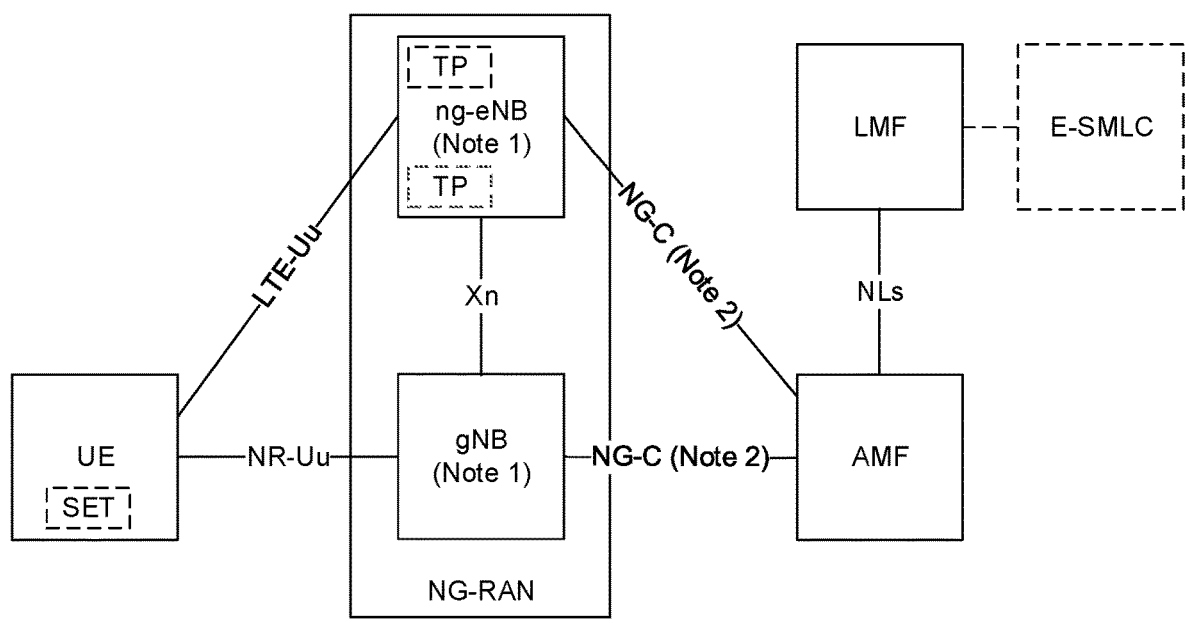
FIG. 1 illustrates a block diagram of an example architecture for positioning in New Radio.
Figure 2:
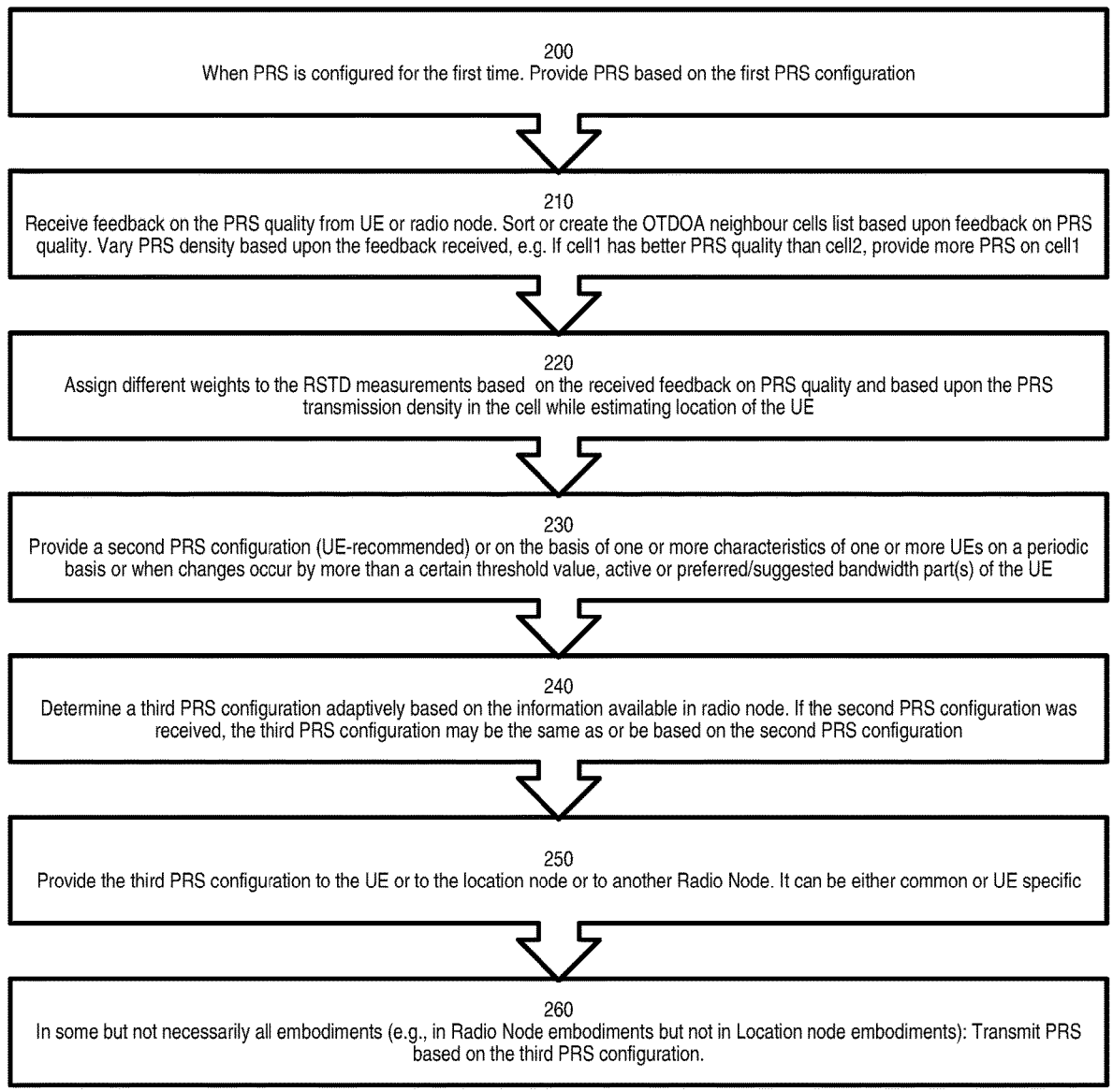
FIG. 2 illustrates a flow diagram of an example method for positioning reference signal configuration performed at a location node and a radio node, according to certain embodiments.

FIG. 2 illustrates an example method for positioning reference signal configuration, in accordance with certain embodiments. The method may be performed at a location node and/or a radio node. Steps 200-230 may be performed at the location node, and steps 240-260 may be performed at the radio node. At step 200, the location node configures a first PRS configuration for the first time, and provides, to a UE, a first PRS based on the first PRS configuration.

At step 210, the location node receives feedback on the quality of PRSs from UE or a radio node in certain scenarios. The location node creates a list of OTDOA neighboring cells based upon the received feedback on the quality of PRSs. The location node varies density for PRSs based upon the received feedback. For example, if cell 1 has a better PRS quality than cell 2, the location node would provide more PRSs on cell 1. In some embodiments, PRS transmission on cell 2 may be stopped. In some embodiments, certain cells may compromise several beams which are used to transmit PRS, therefore, the location node may determine which beams to use for PRS transmission based on the compromised beams.

At step 220, the location node assigns different weights to Reference Signal Time Difference (RSTD) measurements based on the received feedback on the quality of PRSs and based upon the PRS transmission density in the cell while estimating location of the UE.

At step 230, the location node provides, to the radio node, a second PRS configuration which is UE-recommended or based on a basis of one or more characteristics of one or more UEs. In some embodiments, the location node may provide one or more lists of beams. For example, a first list of beams is used for PRS transmission and a second list of beams is not used for PRS transmission. If the quality obtained from a certain beam transmission is below a certain threshold, the location node may recommend a radio node to turn off the PRS transmission in that beam. The location node may provide the second PRS configuration on a periodic basis or when changes occur by more than a certain threshold value, active or preferred/suggested bandwidth part(s) of the UE.

At step 240, the radio node determines a third PRS configuration adaptively based on the information available in the radio node. If the second PRS configuration was received, a third PRS configuration may be the same as or be based on the second PRS configuration.

At step 250, the radio node provides the third PRS configuration to the UE, or to the location node or to another radio node in certain scenarios. In some embodiments, the third PRS configuration may be either common or UE-specific.

At step 260, the radio node transmits additional PRS based on the third PRS configuration to the UE in certain embodiments.

Figure 3:
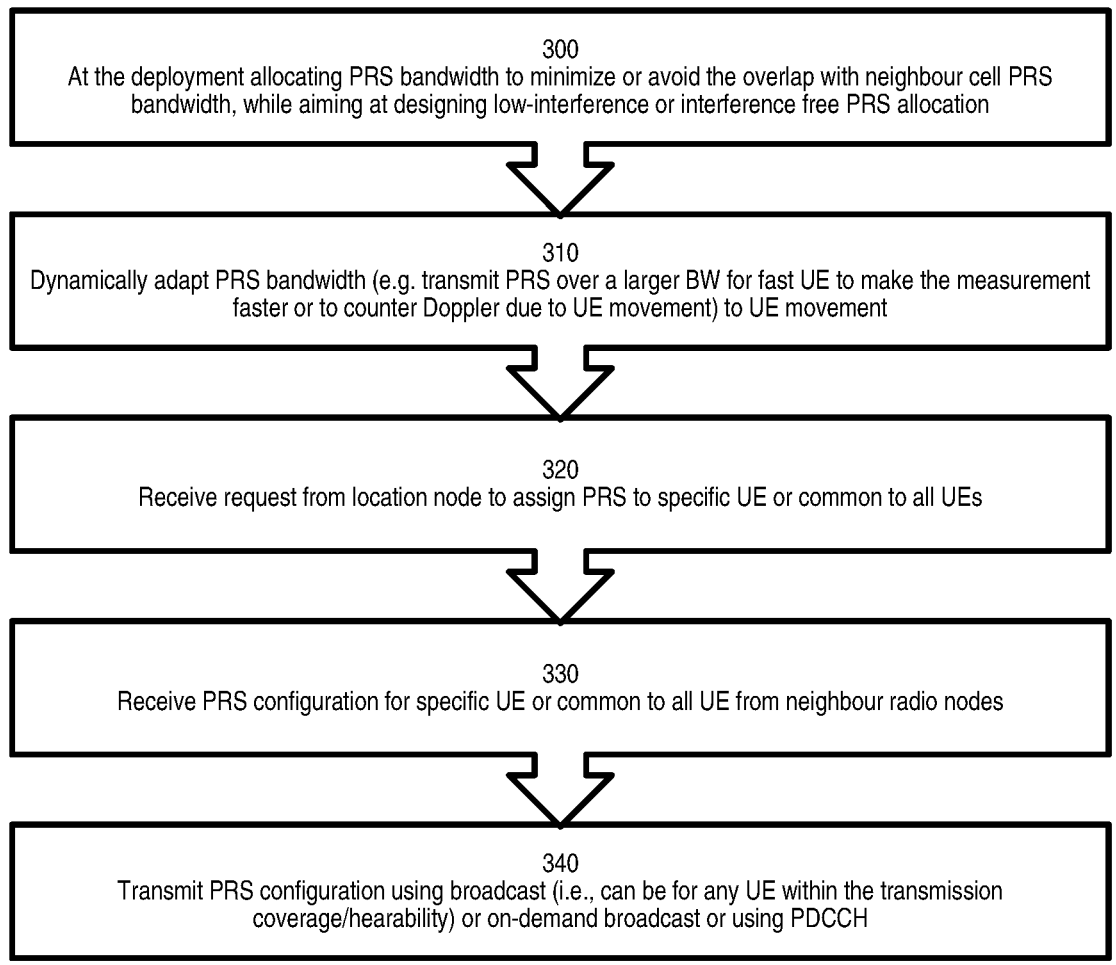
FIG. 3 illustrates a flow diagram of an example method for positioning reference signal configuration performed at a network node, according to certain embodiments.

FIG. 3 illustrates another example method for positioning reference signal configuration, in accordance with certain embodiments. The method may be performed at a location node and/or a radio node. If this method is performed at the location node, the radio node may provide related information to the location node. At step 300, a network node aims at designing low-interference or interference free PRS allocation, as the deployment allocates PRS bandwidth to minimize or avoid the overlap with PRS bandwidths of the neighboring cells.

At step 310, the network node dynamically adapts PRS bandwidth to the UE movement. For example, dynamically adapting PRS bandwidth based on the UE movement is transmitting PRS over a larger bandwidth for fast-moving UE to make the measurement faster or to counter Doppler due to UE movement.

At step 320, the network node receives a request from a location node to assign PRS to a specific UE or commonly to all UEs.

At step 330, the network node receives a PRS configuration for the specific UE or for all UEs from neighboring radio nodes commonly.

At step 340, the network node provides the PRS configuration using, dedicated signaling LTE Positioning Protocol (LPP), broadcast, or using a downlink control information (DCI) PDCCH. In some embodiments, the broadcast may be for any UE within the transmission coverage.

Figure 4:
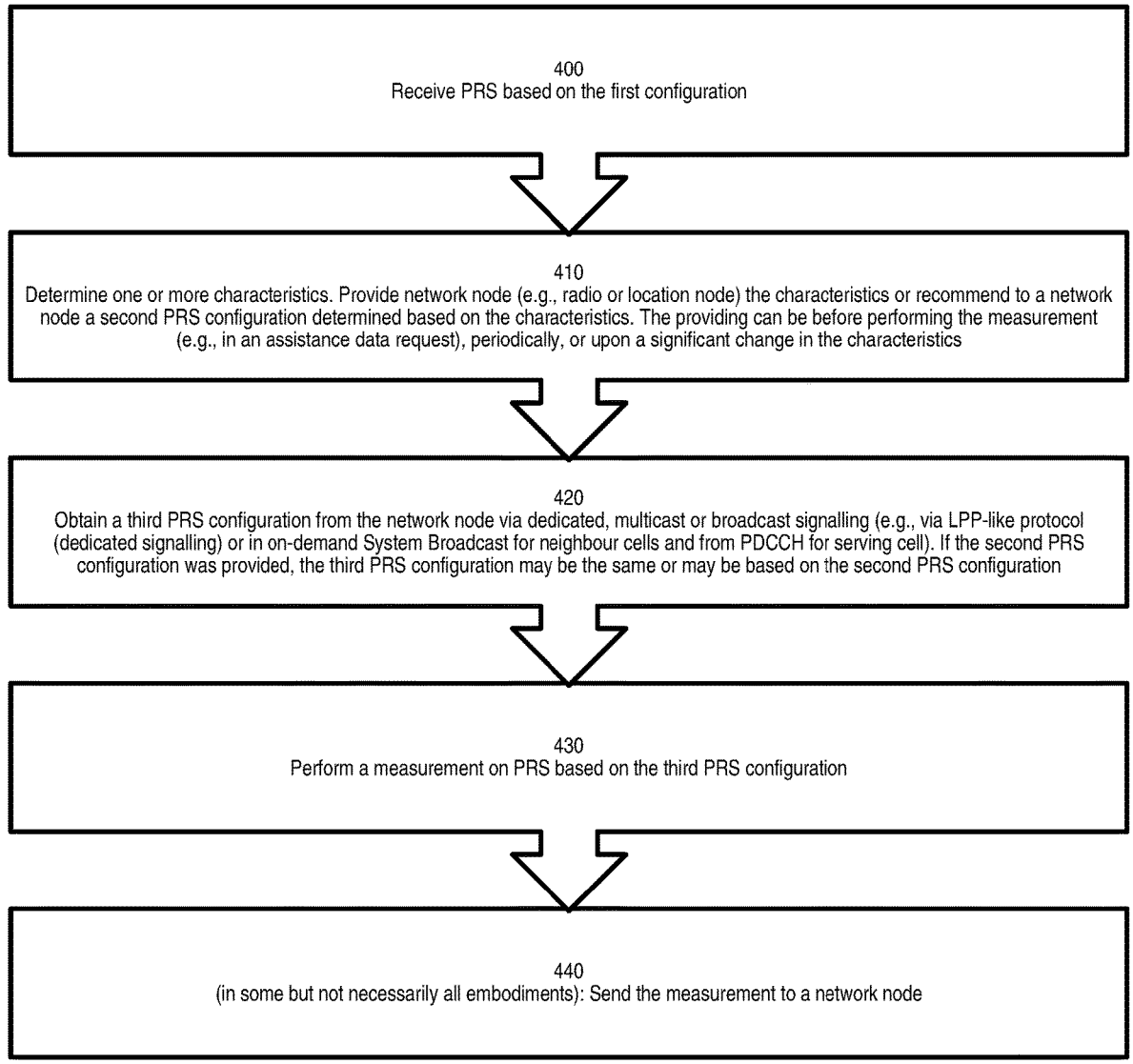
FIG. 4 illustrates a flow diagram of an example method for positioning reference signal configuration performed at a network node, according to certain embodiments.

FIG. 4 illustrates yet another example method for positioning reference signal configuration, in accordance with certain embodiments. The method may be performed at a UE. At step 400, the UE receives PRS from a location node or a radio node. In some embodiments, the received PRS is configured based the first PRS configuration disclosed in step 200 of FIG. 2.

At step 410, the UE determines one or more characteristics of the received PRS, and provides a network node (e.g. a radio node or a location node) the determined characteristics of PRS or a recommendation of PRS. The UE provides the network node a second PRS configuration determined based on the characteristics before performing measurement (e.g., the measurements in an assistance data request), periodically, or upon a significant change in the characteristics.

At step 420, the UE obtains a third PRS configuration from the network node via dedicated, multicast, or broadcast signaling. For example, the transmission of PRS configuration may be made via LPP-like protocol dedicated signaling, in on-demand system broadcast for neighboring cells, and/or from DCI PDCCH for serving cells. If the second PRS configuration was provided, the third PRS configuration may be the same or may be based on the second PRS configuration.

At step 430, the UE performs a measurement on the received PRS based on the third PRS configuration.

At step 440, the UE sends the measurement to the network node under certain scenarios.

FIGS. 2-4 disclose a particular embodiment comprising a method performed by a wireless device for PRS configuration. In a high-level description, the method comprises receiving a first PRS. The method also includes providing feedback to a network node on a quality of the PRS. The method further includes receiving a message comprising a PRS configuration. The PRS configuration specifies one or more additional PRSs having characteristics different than the first PRS, wherein the characteristics of the one or more additional PRSs are based on the feedback provided to the network node. The method additionally includes receiving one or more additional PRSs based on the PRS configuration.

In some embodiments, the PRS configuration is received via dedicated, multicast, on-demand broadcast, or broadcast signaling. For example, the PRS configuration may be received via RRC, LPP, or DCI.

In some embodiments, the method further includes performing one or more measurements on the first PRS. In some embodiments, the method further includes performing one or more measurements on the one or more additional PRSs.

In some embodiments, the method further includes providing with the feedback on the PRSs and information about the environment where the wireless device (e.g. UE) is located.

In some embodiments, the method further includes sending a request message asking for a PRS that is configured for multiple subframes or positioning occasions.

In some embodiments, the method further includes estimating one or more time of arrivals for one or more PRSs.

As another example embodiment a method performed by a network node for PRS configuration, the method comprises providing a first PRS configuration for a UE. The method also includes receiving feedback on the PRS from the UE. The method further includes providing an updated PRS configuration based on the feedback, wherein the updated PRS configuration is different than the first PRS configuration.

In some embodiments, the network node is a base station or a location node.

In some embodiments, the method further includes providing a PRS.

In some embodiments, the method further includes allocating bandwidth for the PRS, wherein the bandwidth is allocated to minimize overlap with PRS bandwidth from neighboring cells. In another embodiments, the bandwidth is allocated for the PRS to avoid an overlap in time and frequency with other PRSs.

In some embodiments, the method further includes receiving a request to assign a PRS configuration to a specific UE.

In some embodiments, the method further includes transmitting the PRS configuration via one of on-demand broadcast, broadcast, multicast, or dedicated signaling.

In some embodiments, the method further includes arranging the measurements in the feedback based on the receive cross correlation factors.

In some embodiments, the measurements related to the higher cross correlation factors are prioritized for better positioning accuracy.

In some embodiments, the method further includes sequentially arranging the measurements in descending order. The descending order may be an order of the values of the cross correlation factors.

In some embodiments, the method further includes discarding measurements done using the PRS from cells resulting in cross correlation factor worse than a threshold.

In some embodiments, the method further includes identifying the cells that have better cross correlation factors and then allocating more PRS resources to the identified cells.

In some embodiments, the cells having better cross correlation factors are those that are above a threshold.

In some embodiments, the cells having better cross correlation factors are the top "X" percent of cells, where "X" is a value between 0% and 100%.

In some embodiments, the method further includes determining whether to use static or dynamic PRS configuration. In some embodiments, the determination is based on a number of UEs in the cell.

In some embodiments, the method further includes creating or sorting a list of OTDOA neighboring cells or beams based upon the feedback received from UE on the PRS quality.

In some embodiments, the method further includes determining which beams to be used for PRS transmission and which beams to be stopped from continuing to be used for PRS transmission.

Particular embodiments of the present disclosure provide dynamic PRS configuration that may have the potential to be tailored for different scenario setups. As another example, when a UE is on the move, a dynamic PRS configuration is more adaptive. As another example, a better utilization of resources is provided than a static PRS assignment. For example, particular embodiments assign large amounts of PRS to specific UE(s) per positioning occasion without excessively wasting downlink resources.

Regarding measurements performed on PRS, the UE along with the RSTD measurements reports back the quantified PRS signal cross correlation factors to the location node. The location node then arranges the RSTD measurements based on the received cross correlation factors and uses the RSTD measurements related to the higher cross correlation factors for better positioning accuracy. Based on the RSTD measurements related to the higher cross correlation factors, the location node prioritizes the RSTD measurement associated with the highest cross correlation factor (in principle estimated using the PRS from the serving cell) and then sequentially arranges rest of the measurements in descending order. A threshold value may be set up, so that the RSTD measurements done using the PRS from the cells resulting into worst cross correlation factor are discarded during positioning of the UE. On the other hand, upon identifying the cells that have better cross correlation factors would be allocated more PRS resources (e.g. denser PRS or wider bandwidth PRS) and new RSTD measurements would hence be done with newly configured PRSs.

In addition, the UE may also report back to the location node information about its current environment. Depending on the environment where the UE is located, it can ask for PRS(s) to be configured for multiple subframes or occasions. If the UE is in a multipath rich environment (e.g., inside a building), then the UE can ask the location node for the UE's PRS to be configured for transmission in multiple consecutive subframes or occasions. For example, depending on the scenario, if a location node is providing the PRS and the location node may be a core network node which is not transmitting any radio signals, instead the location node may instruct radio network nodes to transmit PRS and may suggest a PRS configuration to be used. The UE can then be able to estimate multiple TOAs depending upon the number subframes or occasions for which PRS is configured for and benefit by choosing the least value of TOA for RSTD measurement. In some embodiments, the least value of TOA may be close to line-of-sight (LOS) TOA. Therefore, while configuring adaptive PRS, the number of subframes or occasions needed depending on the UE's location is also considered. In this approach, less consecutive frames or occasions will be used for PRS transmission when the UE is in an open environment, and more consecutive frames or occasions shall be used for PRS transmission when the UE is in an indoor environment or a multipath rich environment. Hence, a dynamic allocation/exploitation of resources is achieved.

Figure 5:
FIG. 5 illustrates an example bandwidth allocation, according to certain embodiments.
Figure 5:
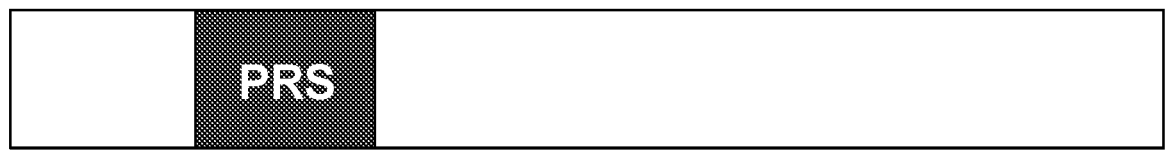
Figure 5:

FIG. 5 illustrates a non-overlapping PRS bandwidth allocation in interfering cells, in accordance with certain embodiments. Regarding how a dynamic PRS configuration, e.g., as fast as per position occasion, is achieved, for a PRS bandwidth allocation, interference mitigation for PRS signal in LTE is achieved by means of muting (e.g. time-based blanking of positioning occasions). When a strong-cell PRS signal is muted, a weak, neighboring PRS can be detected. However, this leads to resource wastage and a configuration needs to be tightly monitored and controlled to achieve muting and interference-free. A simplified way to take available wide bandwidth in NR is needed. FIG. 5 shows a scheme to avoid interference can be to have a non-overlapping bandwidth for PRS. Therefore, the PRS occasions never appear at the same time or frequency and thus there is no interference.

The amount of bandwidth and/or the PRS would be adapted based on different occasions. For example, for high speed UE, a larger bandwidth would be allocated to make faster measurements. The bandwidth would be also adaptive to counter Doppler due to UE movement. Similarly, based upon QoS of UE required for location accuracy and latency, the PRS configuration may be made adaptively. The bandwidth that is unused for PRS can be used by the radio node for other transmissions, e.g., data transmission, or can be left blank, which can be decided e.g. by the transmitting radio network nodes and/or by other network nodes (e.g., O&M, SON, location node, etc.) coordinating PRS allocation in the transmitting radio nodes.

Regarding density of PRSs, it can also be observed that more cells transmit over the overlapping PRS bandwidths without causing interference when PRS are sparse (e.g., with a fewer PRS resource element per resource block or with a reuse at higher frequency). To compensate for fewer REs, a larger bandwidth may be needed. The advantage with overlapping bandwidths but sparse PRS is that the UE will be able to receive PRS from different cells without retuning to different frequencies and without measurement gaps.

Figure 6:
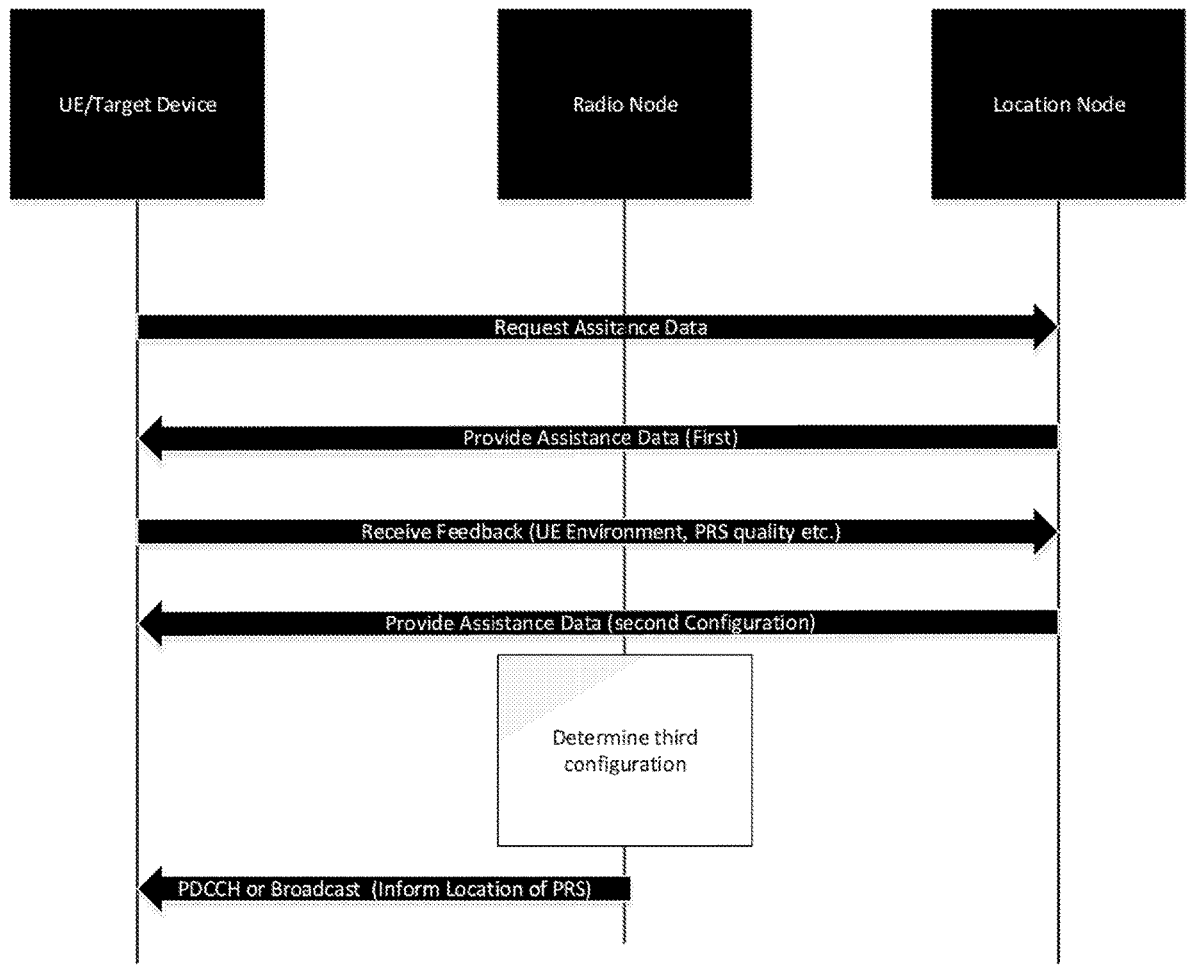
FIG. 6 illustrates an example procedure for determining a dynamic PRS configuration, according to certain embodiments.

FIG. 6 illustrates a sequence of flow among a location node, a radio node, and a UE, in accordance with certain embodiments. UE indicates its behavior and channel characteristics while requesting assistance data. This can be done while UE requests for OTDOA assistance data (AD) in a common Request AD message as shown in Table 1, or it can be a part of the common Request AD message.

For indication of UE behavior, in which the behavior comprises: displacement from the previous reporting, indication of being stationary, speed and velocity, acceleration, beam reporting, UE numerology (e.g., currently used or preferred or supported subcarrier spacing or CP), non-PRS signal (e.g., SSB or CSI-RS) strength or quality characterizing cell and/or beam signals, implicit or explicit indication of N (N=1, 2 . . . ) best beams of a cell, and PRS strength or PRS quality measurement (e.g., PRS received power, PRS SINR, PRS Es/Iot, etc.).

Indication of channel characteristic comprises: indication of being in indoor/semi-indoor or outdoor environment, beam measurement, SINR, Reference Signal Received Power (RSRP) of a set of cells based upon PRS, and CQI, etc.

For step 230 in FIG. 2, the UE characteristics may be: UE environment type, UE velocity, UE numerology (e.g., currently used or preferred or supported subcarrier spacing or CP), non-PRS signal (e.g., SSB or CSI-RS) strength or quality characterizing cell and/or beam signals, implicit or explicit indication of N (N=1, 2 . . . ) best beams of a cell, and/or PRS strength or PRS quality measurement (e.g., PRS received power, PRS SINR, PRS Es/Iot, etc.).

For step 240 in FIG. 2, the available information in radio node may be: PRS sequence, PRS numerology, PRS density, PRS bandwidth, number of PRS occasions, a number of PRS subframes, a number of beams to be used by a cell to transmit PRS to the UE, beam-specific time-frequency resources for PRS, CP of the PRS subframe, and/or PRS center frequency to be within the active or preferred/suggested bandwidth part(s) of the UE.

The IE OTDOA-RequestAssistanceData is used by the target device to request assistance data from a location node.

Figure 7:
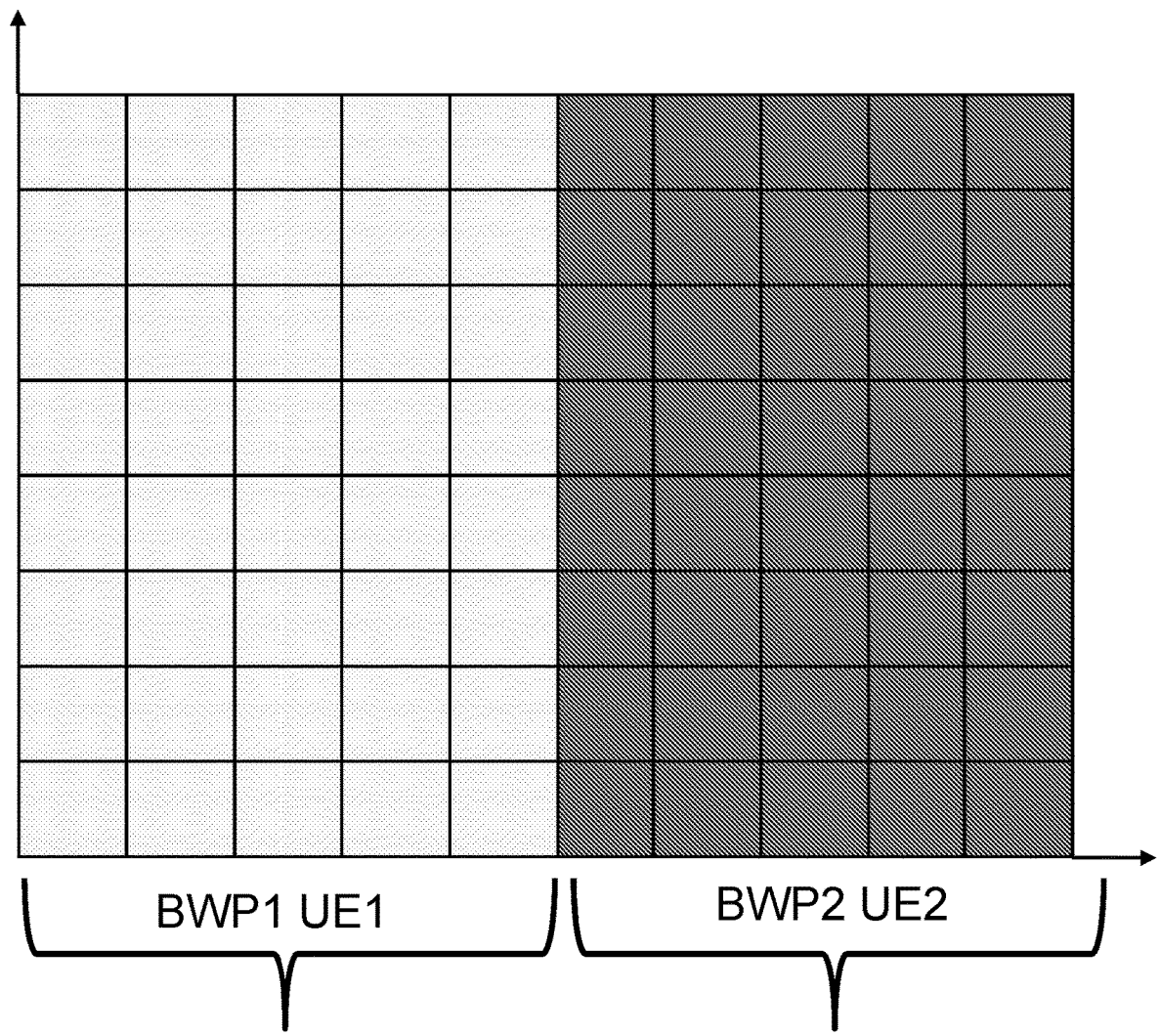
FIG. 7 illustrates an example PRS allocation, according to certain embodiments.

FIG. 7 illustrates an example allocation of PRS with respect to bandwidth for two different UEs, in accordance with certain embodiments. A dynamic allocation of PRSs may be assigned via DCI. In some embodiments, a bandwidth part 1 (BWP1) may be assigned to UE 1, and a bandwidth part 2 (BWP2) may be assigned to UE2, where the BWP1 and BWP2 do not overlap.

Figure 8:
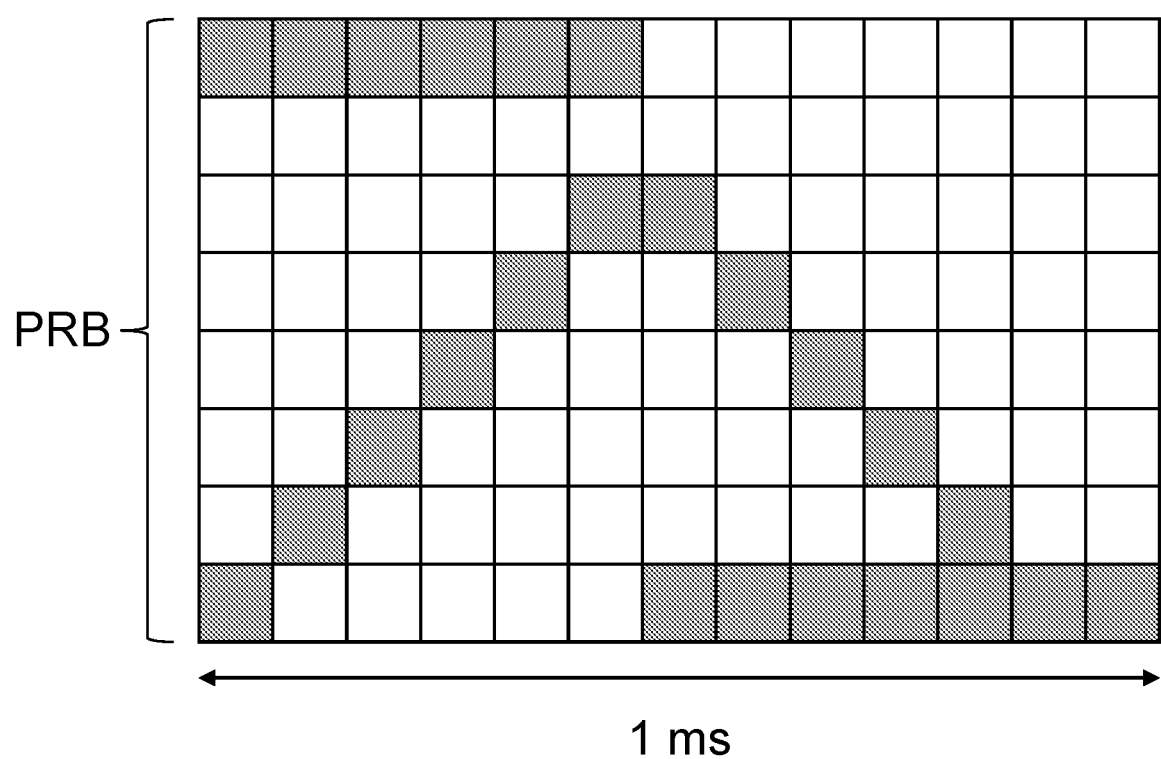
FIG. 8 illustrates an example PRS pattern, according to certain embodiments.

FIG. 8 illustrates an example PRS pattern in a single physical reference block (PRB), in accordance with certain embodiments. The PRB is dedicated for the UE 1 disclosed in FIG. 7. In some embodiments, the PRS resource elements may be consecutive or non-consecutive. In some embodiments, the PRS resource elements may have diagonal or non-diagonal patterns. Potentially, all reference elements could be used for PRS.

Figure 9:
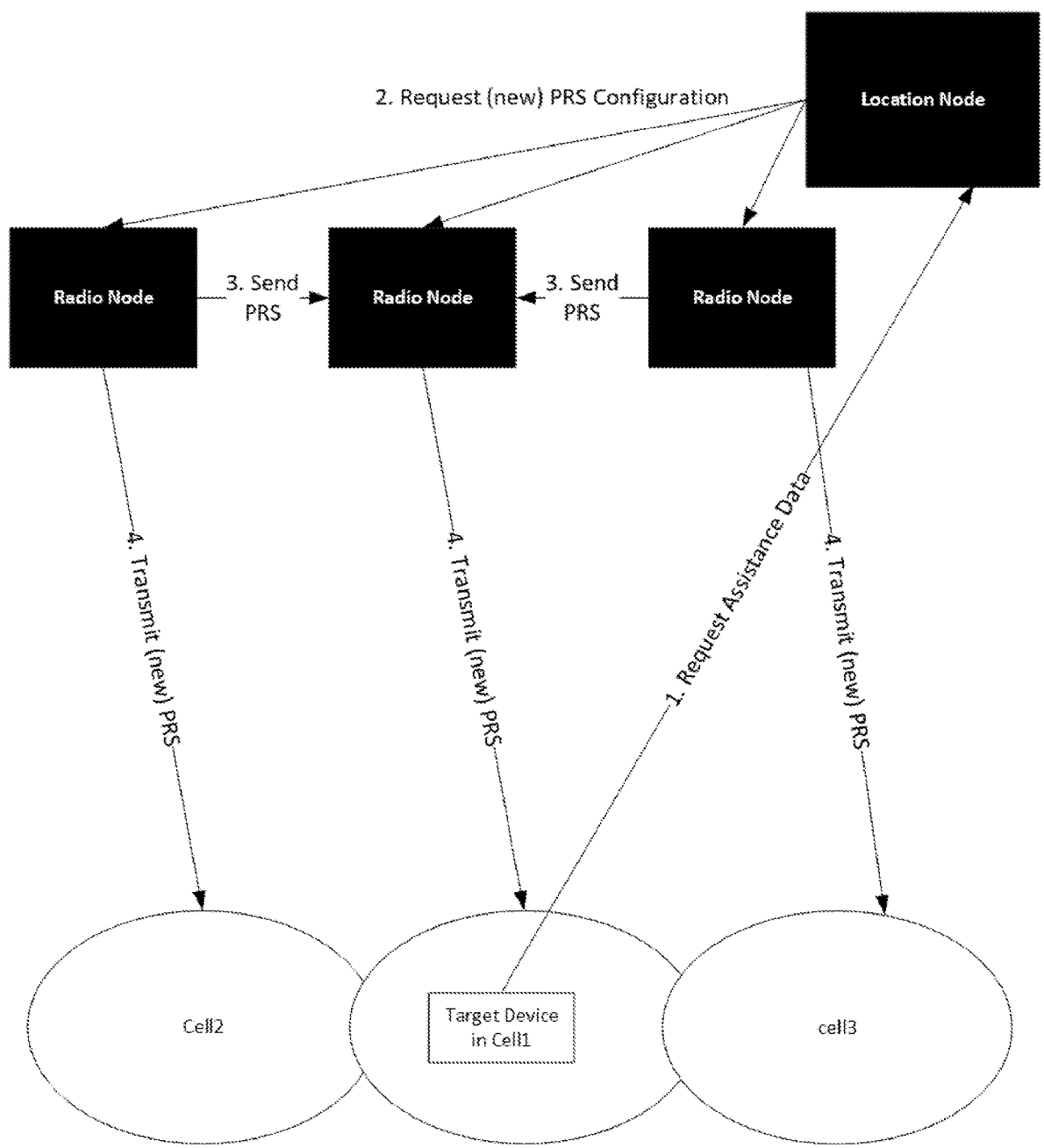
FIG. 9 illustrates a diagram of an example architecture for dynamic PRS configuration, according to certain embodiments.

FIG. 9 illustrates an example transmission PRS from a radio node, in accordance with certain embodiments. A location node may receive a request of assistance data from a target device. The location node may send a request of PRS configuration to a radio node (e.g. a serving radio node and a neighboring radio node). In some embodiments, the location node may trigger a request of PRS reconfiguration to the radio nodes. In some embodiments, the neighboring radio node may trigger a request of PRS reconfiguration to the serving radio node which is independent of the request sent from the location node. The radio node may provide dynamic and static configurations of PRS (e.g. a PRS configuration for serving and neighboring cells). When a target device is in the serving cell, the target device receives a dynamic PRS configuration from the DCI (PDCCH). The neighboring radio node would send a PRS configuration to the serving radio node, which may then be sent to the target device by the serving Radio Node via PDCCH. In some embodiments, the radio node may receive new request from a location server (e.g. the location node) for a new PRS configuration. Furthermore, the serving and neighbor radio nodes would communicate with each other regarding whether to increase/decrease the PRS allocations via a X2/Xn interface.

TABLE 1

IE of OTDOA-RequestAssistanceData

```
-- ASN1START
OTDOA-Request AssistanceData ::= SEQUENCE {
  physCellId     INTEGER (0..503),
  ...,
  [[
  adType-r14    BIT STRING { prs (0), nprs (1) } (SIZE (1..8))     OPTIONAL
  ]],
  [[
  velocity   Velocity OPTIONAL
  enviornmnet ENUMERATED {indoor, outdoor, ioo}
  ]]
}
-- ASN1STOP
```

The location node informs a radio node to allocate PRS. In some embodiments, the radio node may assign PRS based upon feedback received from UE. The location node sends the assignment request also to other neighboring radio nodes. Other radio nodes send their PRS configuration to the serving radio node as shown further in FIG. 9. Serving Radio Node may send the PRS configuration by broadcast (e.g. on-demand broadcast) or via PDCCH as shown further in FIG. 9.

Alternately, a static configuration may also be done for all common, non-serving UEs. The target device may obtain the configuration information on demand from system information broadcast by the serving radio node.

Particular embodiments of the present disclosure may also provide a combination of a statically configured part of the PRS pattern and dynamically configured part of the PRS pattern. Both of which together will comprise the PRS pattern transmitted from a radio node, e.g. the serving radio node.

Regarding a determination of PRS configuration, especially a dynamic or static PRS configuration and a dense or sparse PRS in the PRS configuration, the location node depending on the number of UEs in cell and UE capabilities may decide whether to use a dynamic or static configuration. If UEs are limited, it would be more suitable to use dedicated and similar PRS when more UEs are involved with positioning, then on-demand broadcast solution may be adopted. Depending upon the feedback provided upon the PRS quality by the UE, the network node may decide whether to provide a dense or sparse PRS configuration. If the quality of PRS for certain cell is better, the location node may decide to provide a denser PRS configuration in the better ranked cell and sparse in the worse one to save resources. Therefore, a better utilization of resource can be achieved.

Examples of determining a new PRS configuration may include:
1. Increase PRS configuration in a cell (e.g., increase one or more of bandwidth, density, number of PRS resource elements within a resource block and/or a subframe, a number of PRS subframes per positioning occasion, etc.) or reduce PRS frequency reuse, when the quality characteristic of the cell is below a first threshold for N1 of UEs (N1=1, 2, . . . ) or Y1% of UEs, where N1 and Y1 may be pre-defined or configured; and
2. Decrease PRS configuration in a cell (e.g., one or more of reduction of bandwidth, density, a number of PRS resource elements within a resource block and/or subframe, a number of PRS subframes per positioning occasion, etc.) or increase PRS frequency reuse, when the quality characteristic of the cell is above a second threshold for N2 of UEs (N2=1, 2, . . . ) or Y2% of UEs, where N2 and Y2 may be pre-defined or configured.

In the above examples, if the second PRS configuration is suggested by the UE, then it is straightforward that N1 and N2 would be 1 and Y1 and Y2 would not be applicable in this specific embodiment.

Furthermore, the location node may also create or sort a neighboring cell list for its OTDOA based upon the feedback received from UE on the PRS quality. For example, the list may include the cells with the feedback indicative of their good or acceptable quality or the quality above a threshold. The sorting may also be done in the order determined by the feedback, e.g., decreasing or increasing quality.

Similarly, the location node may give weightage to different RSTD measurements, while calculating the UE location, based upon the perceived quality of PRS and based upon the PRS transmission density. The weightage will provide a better estimation of UE location.

Figure 10:
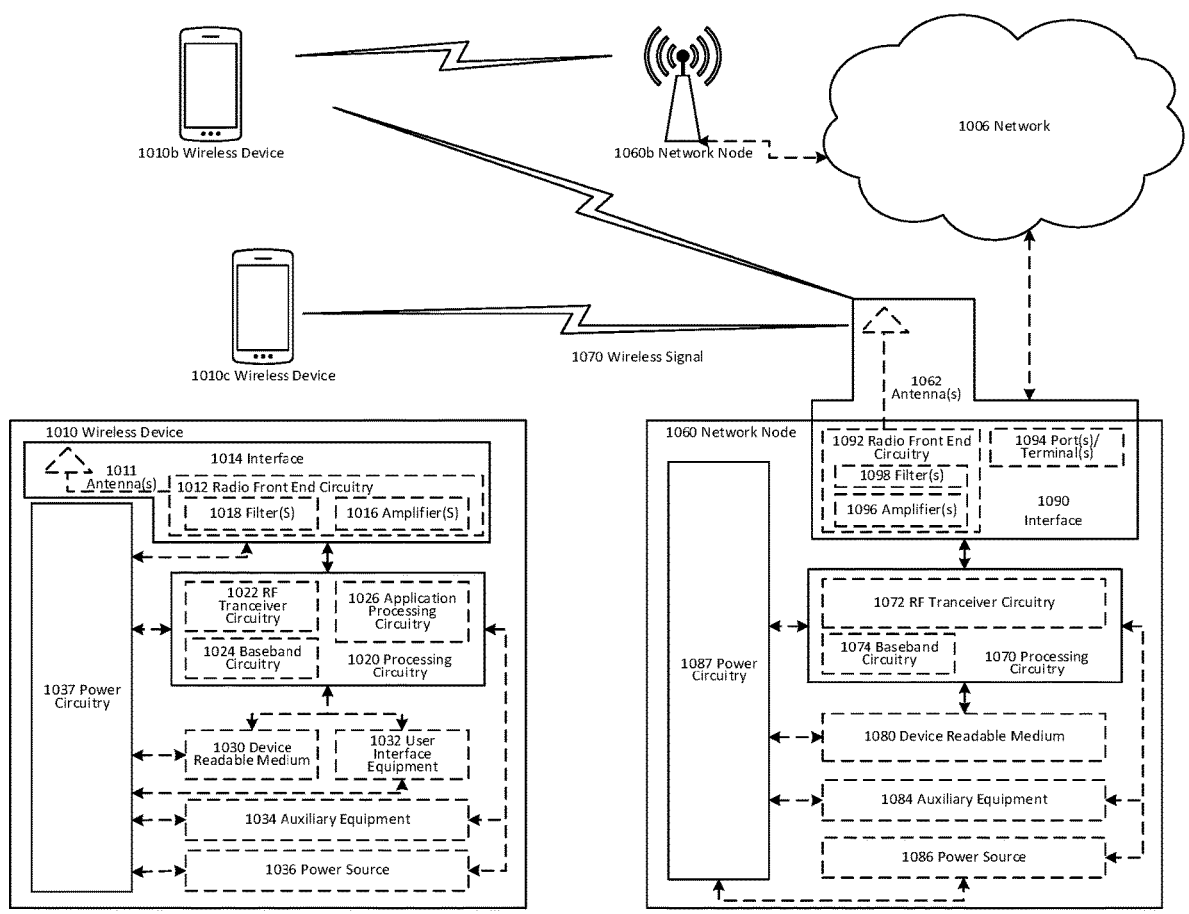
FIG. 10 illustrates an example wireless network, according to certain embodiments.

FIG. 10 is an example wireless network, in accordance with certain embodiments. Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and wireless devices (WDs) 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. In some embodiments, the network node 1060 may be a base station, such as an eNB. In the present disclosure, the term eNB may be used to refer to both an eNB and a ng-eNB unless there is a specific need to distinguish between the two. In certain embodiments, the network node 1060 may be a network node, which is further illustrated in FIGS. 23 and 27. In certain embodiments, the network node 1060 may be a source network node. In certain embodiments, the network node 1060 may be a target network node. In certain embodiments, the wireless device 1010 may be a user equipment, which is further illustrated in FIGS. 23 and 26. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1088, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. In particular embodiments, the processing circuitry 1070 of the network node 1060 may perform a method which is further illustrated in FIGS. 20-22, and 25. The benefits provided by such functionality are not limited to processing circuitry 1070 alone or to other components of network node 1060 but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signaling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). In certain embodiments, the wireless device 1010 may be a user equipment which is further depicted in FIGS. 23 and 26. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein. In particular embodiments, the processing circuitry 1020 of the WD 1010 may execute instructions to perform measurements for certain cells in the network 1006, which is further illustrated below. In particular embodiments, the processing circuitry 1020 of the wireless device 1010 may perform a method which is further illustrated in FIGS. 19 and 24.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionalities described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
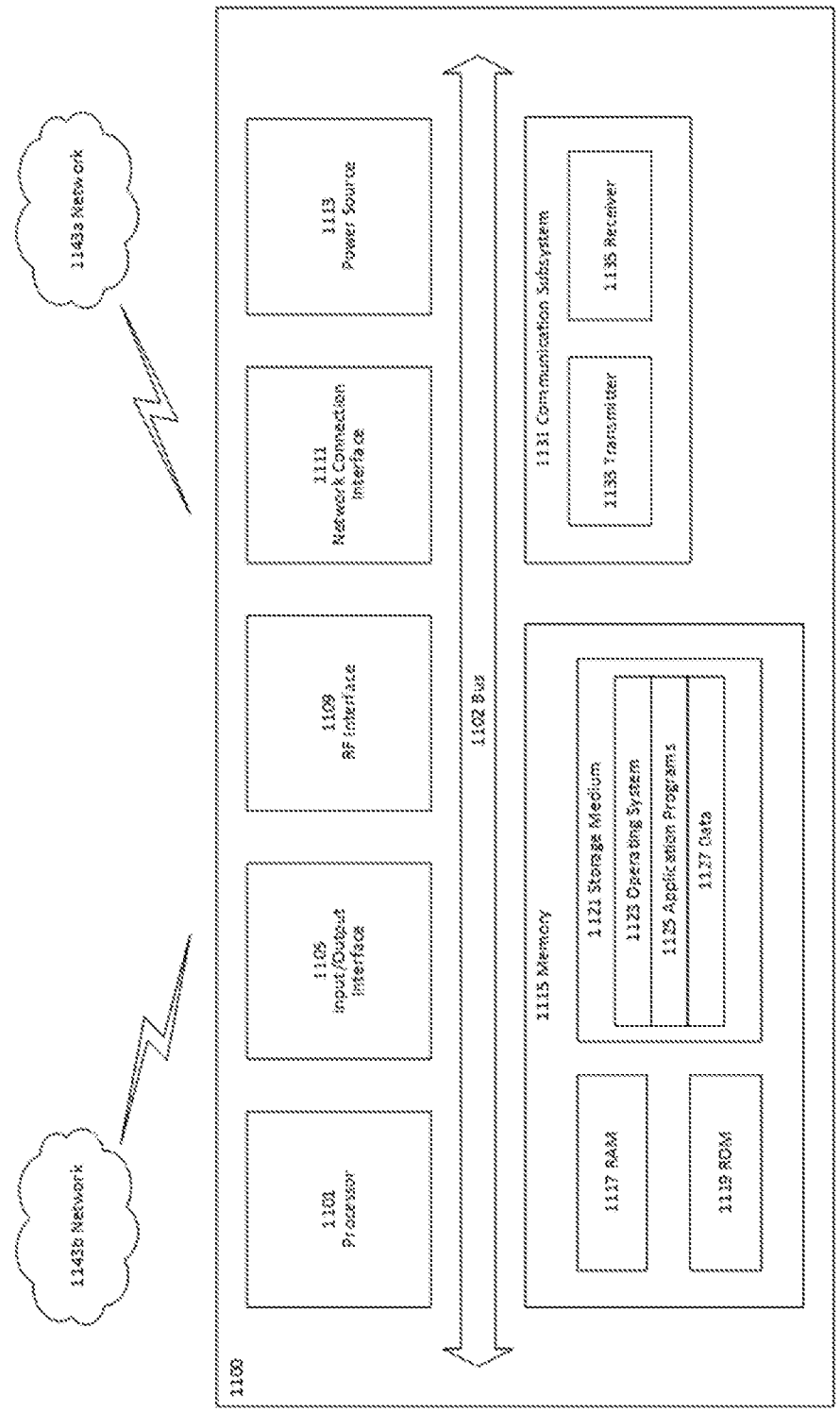
FIG. 11 illustrates an example user equipment, according to certain embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the 3rd Generation Partnership Project (3GPP), including a NB-IoT UE, a MTC UE, and/or an enhanced MTC (eMTC) UE. UE 1100, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. In certain embodiments, the user equipment 1100 may be a user equipment which is further depicted in FIGS. 23 and 26. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer. In certain embodiment, processing circuitry 1101 may perform a method which is further illustrated in FIGS. 19 and 24.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
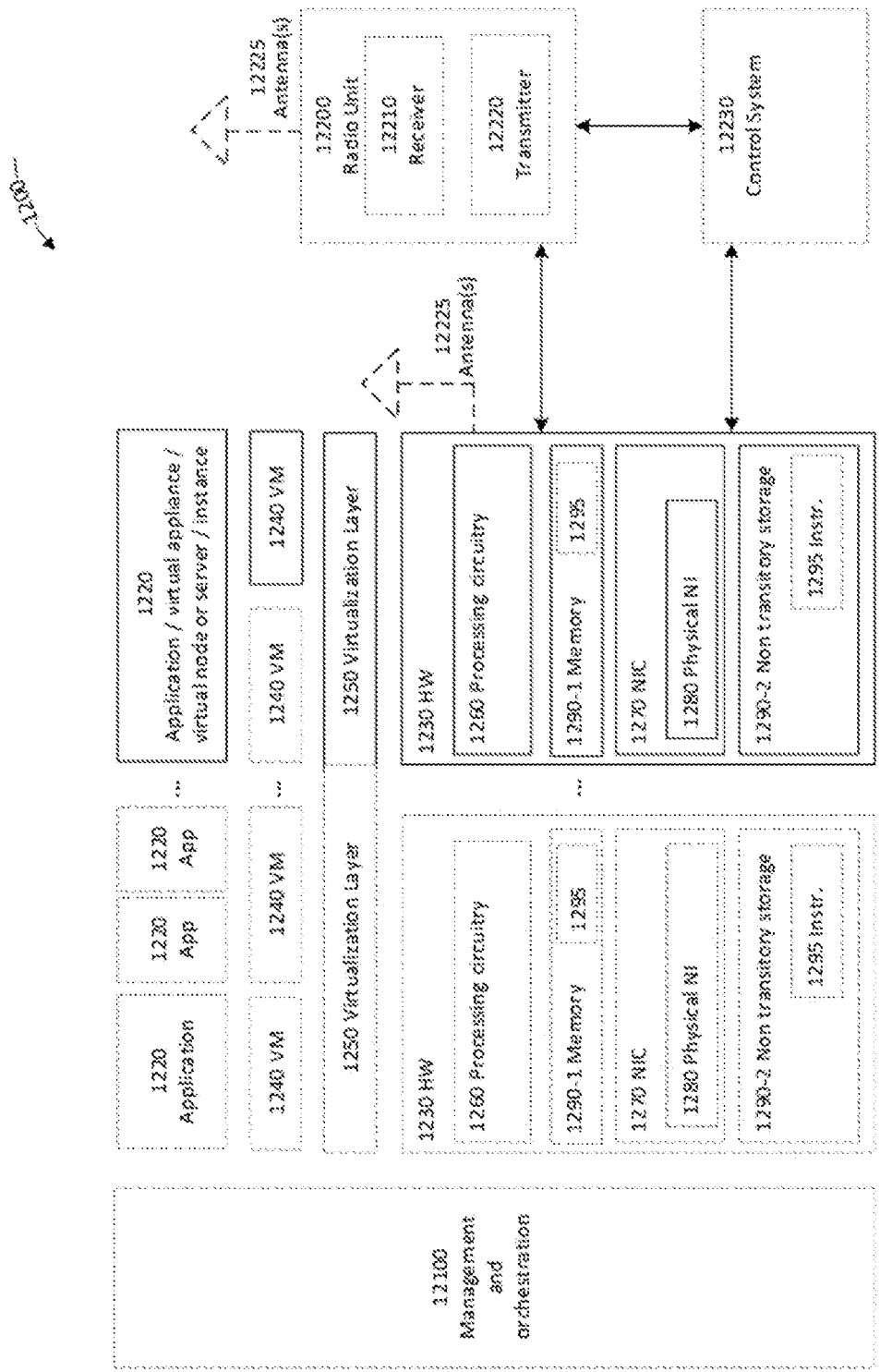
FIG. 12 illustrates an example virtualization environment, according to certain embodiments.

FIG. 12 illustrates an example virtualization environment, according to certain embodiments. FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be affected with the use of control system 12230 which may alternatively be used for communication between the hardware nodes 1230 and radio units 12200.

Figure 13:
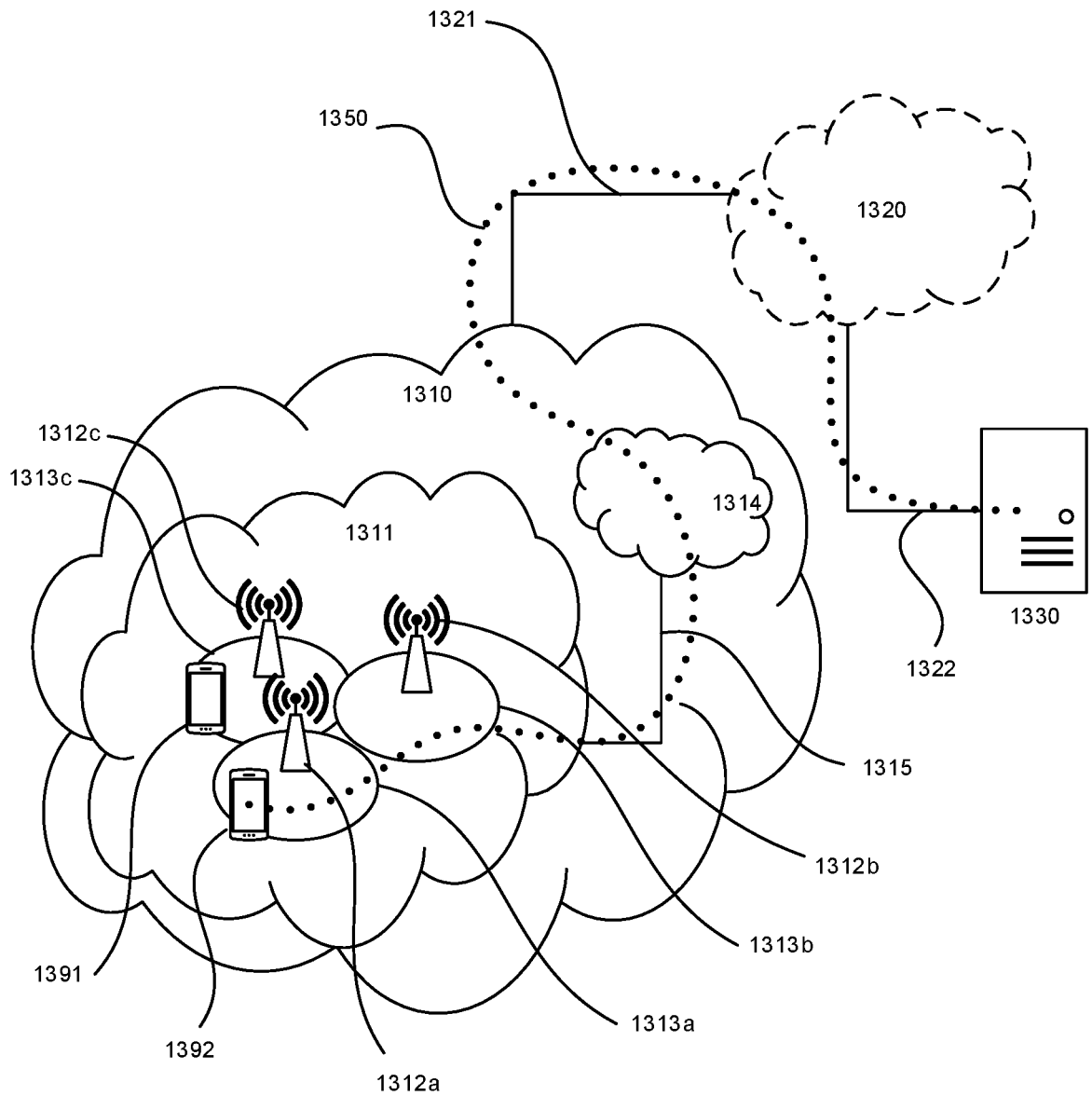
FIG. 13 illustrates an example telecommunication network connected via an intermediate network to a host computer, according to certain embodiments.

FIG. 13 illustrates an example telecommunication network connected via an intermediate network to a host computer, according to certain embodiments. With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312. In certain embodiments, the plurality of UEs 1391, 1392 may be a user equipment as described with respect to FIGS. 23 and 26.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
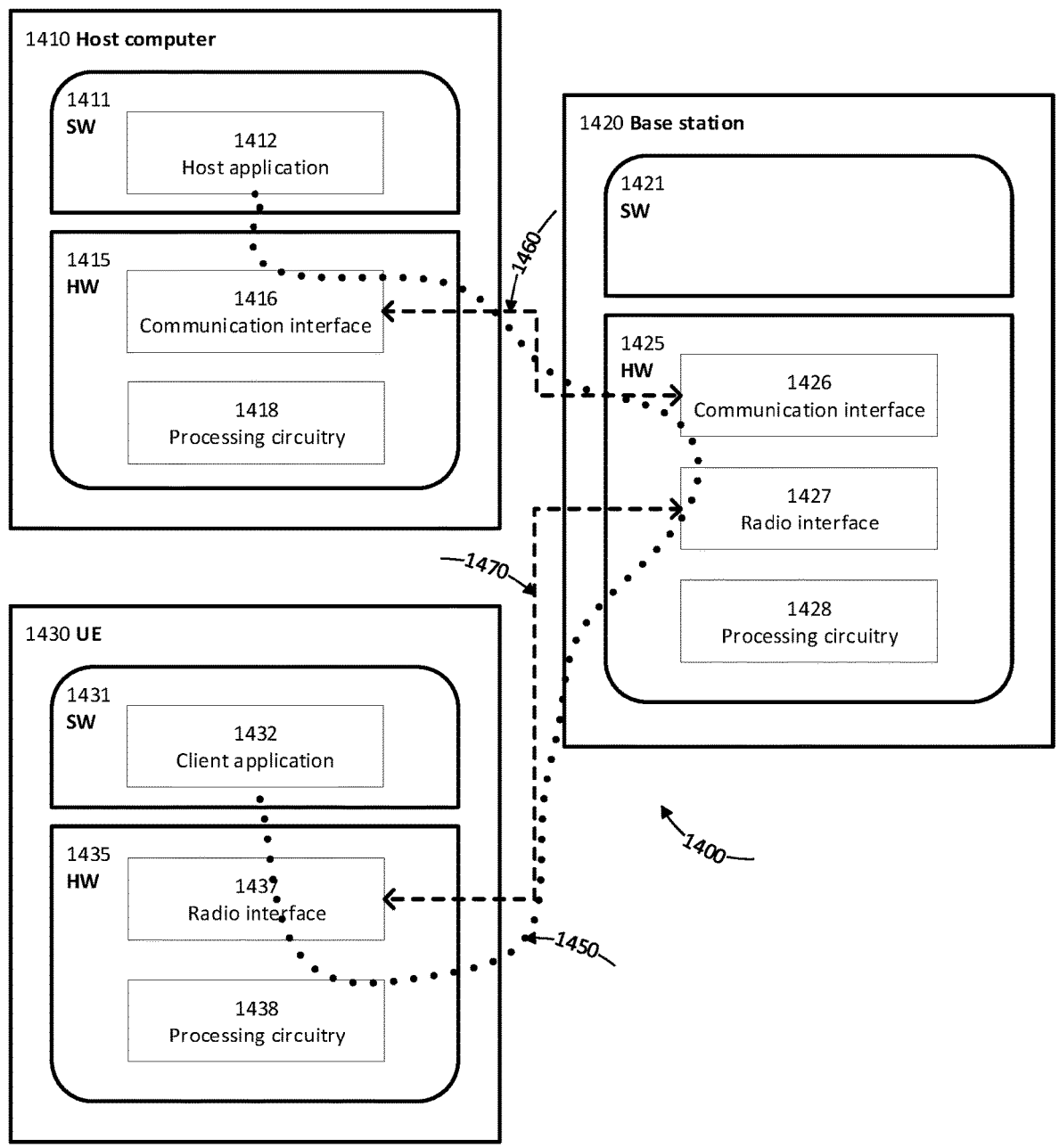
FIG. 14 illustrates an example host computer communicating via a base station with a user equipment over a partially wireless connection, according to certain embodiments.

FIG. 14 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. In certain embodiments, the UE 1430 may be a user equipment as described with respect to FIGS. 23 and 26. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420.

Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. In certain embodiments, the UE 1430 may be the user equipment as described with respect to FIGS. 23 and 26. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities.

The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
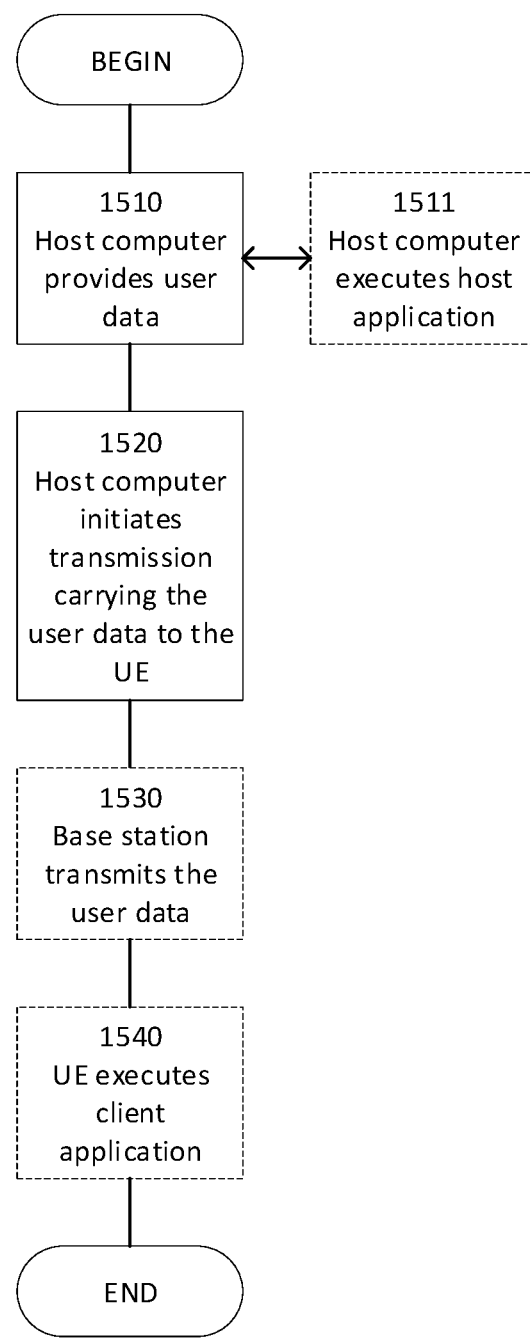
FIG. 15 illustrates an example method implemented in a communication system including a host computer, a base station and a user equipment, according to certain embodiments.

FIG. 15 illustrates an example method implemented in a communication system including a host computer, a base station and a user equipment, according to certain embodiments in accordance with some embodiments. More specifically, FIG. 15 is a flowchart illustrating a method implemented in a communication system, in accordance with one embodiment. The communication system includes a host computer, a base station which may be a network node described with reference to FIGS. 23 and 27, and a UE which may be a user equipment described with reference to FIGS. 23 and 26. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
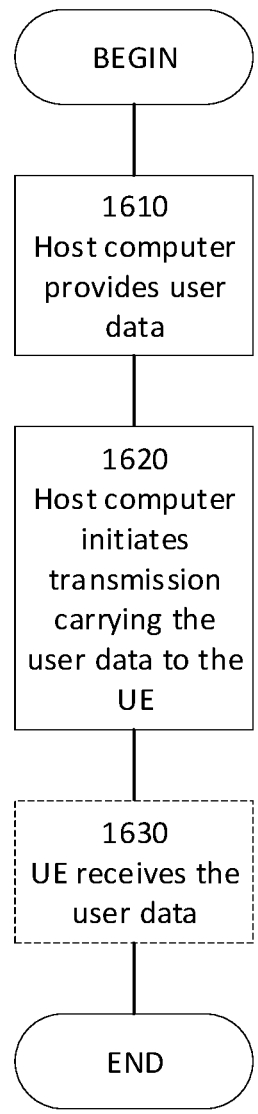
FIG. 16 illustrates another example method implemented in a communication system including a host computer, a base station and a user equipment, according to certain embodiments.

FIG. 16 illustrates an example method implemented in a communication system including a host computer, a base station and a user equipment, in accordance with some embodiments. More specifically, FIG. 16 is a flowchart illustrating a method implemented in a communication system, in accordance with one embodiment. The communication system includes a host computer, a base station which may be a network node described with reference to FIGS. 23 and 27, and a UE which may be a user equipment described with reference to FIGS. 23 and 26. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
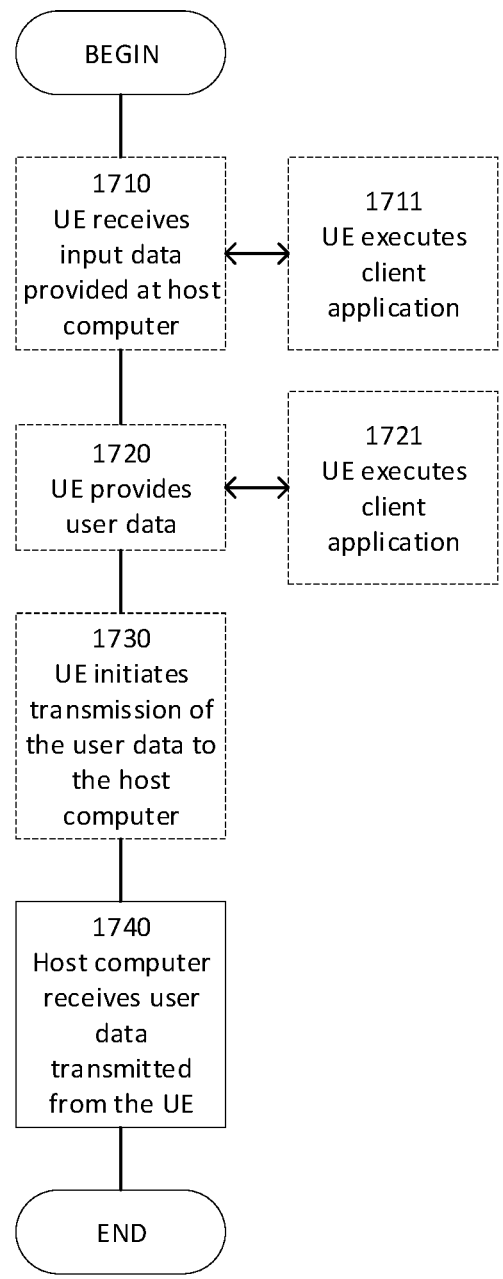
FIG. 17 illustrates another further example method implemented in a communication system including a host computer, a base station and a user equipment, according to certain embodiments.

FIG. 17 illustrates another further example method implemented in a communication system including a host computer, a base station and a user equipment, in accordance with some embodiments. More specifically, FIG. 17 is a flowchart illustrating a method implemented in a communication system, in accordance with one embodiment. The communication system includes a host computer, a base station which may be a network node described with reference to FIGS. 23 and 27, and a UE which may be a user equipment described with reference to FIGS. 23 and 26. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
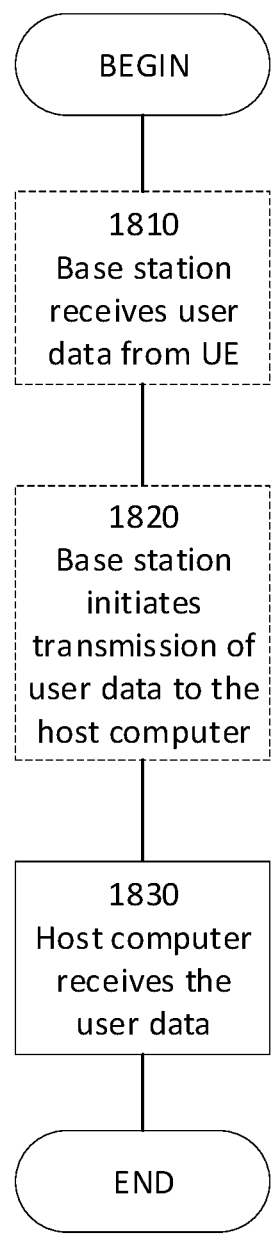
FIG. 18 illustrates another yet example method implemented in a communication system including a host computer, a base station and a user equipment, according to certain embodiments.

FIG. 18 illustrates another example method implemented in a communication system including a host computer, a base station and a user equipment, in accordance with some embodiments. More specifically, FIG. 18 is a flowchart illustrating a method implemented in a communication system, in accordance with one embodiment. The communication system includes a host computer, a base station and a UE. In one embodiment, the base station may be a network node described with references to FIGS. 23 and 27. In one embodiment, the UE may be a user equipment described with reference to FIGS. 23 and 26. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Figure 19:
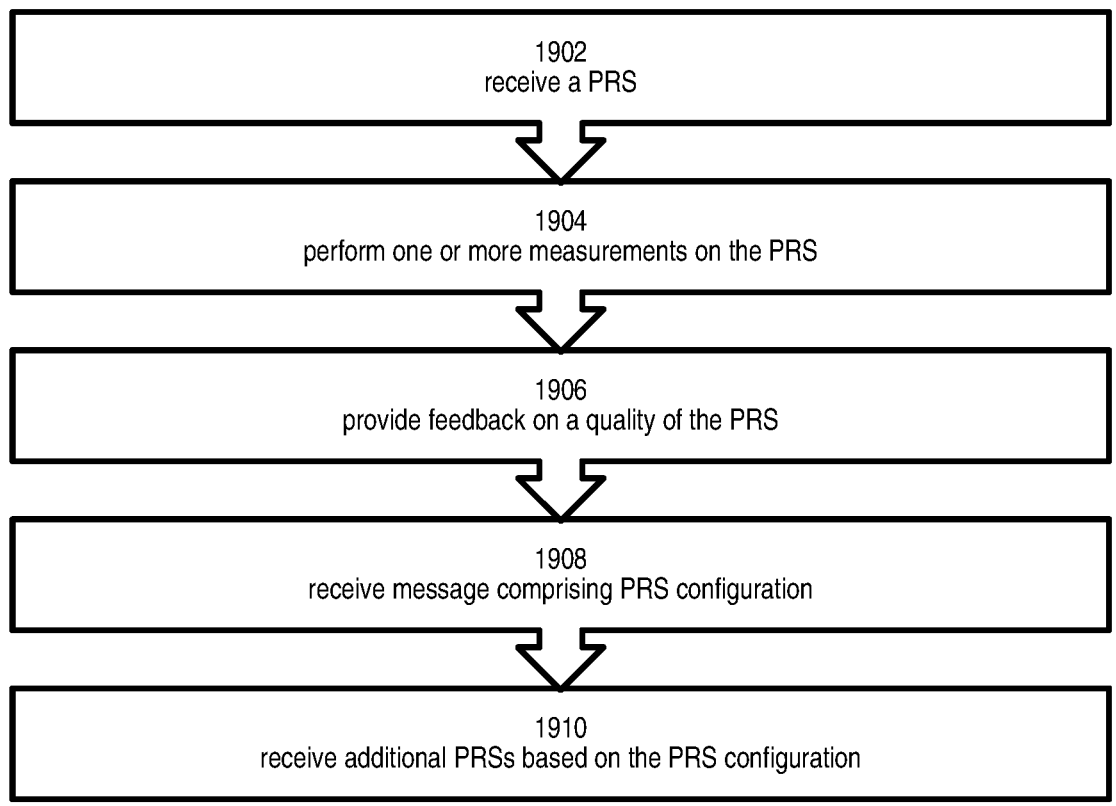
FIG. 19 illustrates a flow diagram of an example method performed by a UE, in accordance with certain embodiments.

FIG. 19 illustrates an example method performed at a UE, in accordance with particular embodiments. The flowchart illustrates some steps of the method from the perspective of a UE or wireless device. The method begins at step 1902 with the UE receiving a first PRS transmitted by a first radio node.

At step 1904, the UE performs one or more measurements on the first PRS transmitted by the first radio node. The measurements may ascertain the quality (e.g., signal strength, noise, etc.) of the received PRS. In some embodiments, the measurements may include estimates of one or more time of arrivals for one or more PRSs. In some embodiments, the first radio node may be a location node or a based station.

At step 1906, the UE provides the first radio node with feedback on the measured quality of the PRS. In some embodiments, information about the environment where the UE is located may be provided along with the feedback.

At step 1908, the UE receives a message comprising a PRS configuration. The message with the PRS configuration may be received via dedicated, multicast, on-demand broadcast or broadcast signaling, or system information. The PRS configuration may specify one or more additional PRSs that will be transmitted by the first radio node. These additional PRSs may have signal characteristics that are different than the first PRS received at step 1902. In some embodiments, the characteristics of the one or more additional PRSs are based on the feedback provided to the network node at step 1906.

At step 1910, the UE receives an additional PRS, or additional PRSs, based on the PRS configuration received at step 1908. From here, the method may repeat steps 1904-1908 only with the additional PRS. In some embodiments, the additional PRS may be received in response to the UE having sent a request message asking for a PRS. In some embodiments, the request may further ask for a PRS that is configured for multiple subframes or occasions.

Although not illustrated, in some embodiments, the method may also include providing user data and forwarding the user data to a host computer via transmission to a base station.

Figure 20:
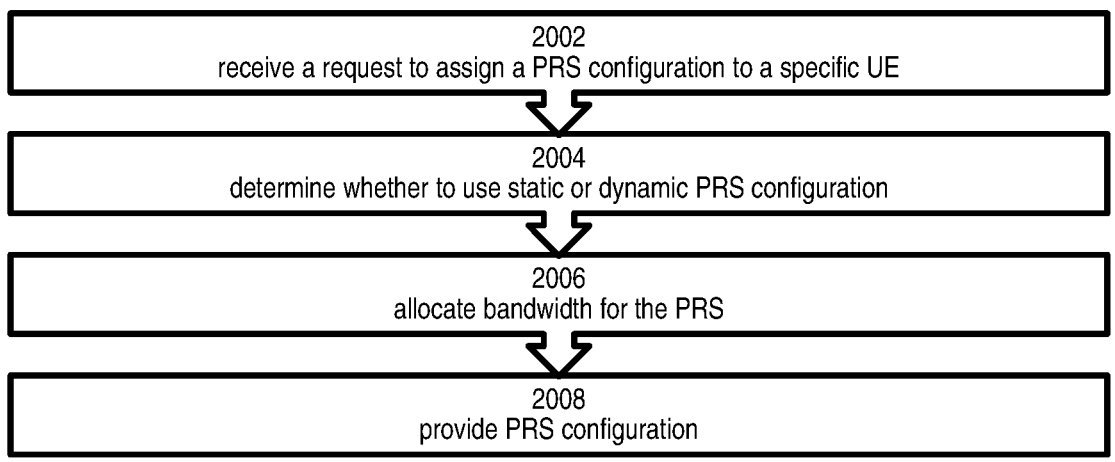
FIG. 20 illustrates a flow diagram of an example method performed by a network node, in accordance with certain embodiments.

FIG. 20 illustrates an example method performed at a network node, in accordance with particular embodiments. The flowchart illustrates some steps of the method from the perspective of a network node (e.g., a radio node, such as an eNB, or a core network node, such as a location node). The method begins at step 2002 with the network node receiving a request to assign a PRS configuration to a specific UE. In some embodiments, this step may occur after the UE has already been provided with a first PRS configuration. The request may be received directly from the UE, or it may be received from a radio node that received it from the UE.

At step 2004, the network node determines whether to use a static or dynamic PRS configuration. In some embodiments, the network node may determine to use a combination of dynamic and static PRS configurations. Depending on the embodiment, the determination may be made on factors, such as the total number of UEs in a cell, the number of UEs served by the cell and configured to use PRS of the cell, or the number of UEs served by this or a neighboring cell and configured to use PRS of this cell.

At step 2006, the network node allocates bandwidth for the PRS. The bandwidth may be allocated so as to minimize overlap with PRS bandwidth from interfering neighboring cells. In some embodiments, the bandwidth may be allocated to avoid an overlap in time and frequency with other PRSs.

At step 2008, the network node provides a PRS configuration for the UE. The PRS configuration may be provided to a radio node to then be transmitted to the UE, or if the network node is a radio node, the PRS configuration may be provided directly to the UE. The updated PRS configuration may be different than the first PRS configuration.

Figure 21:
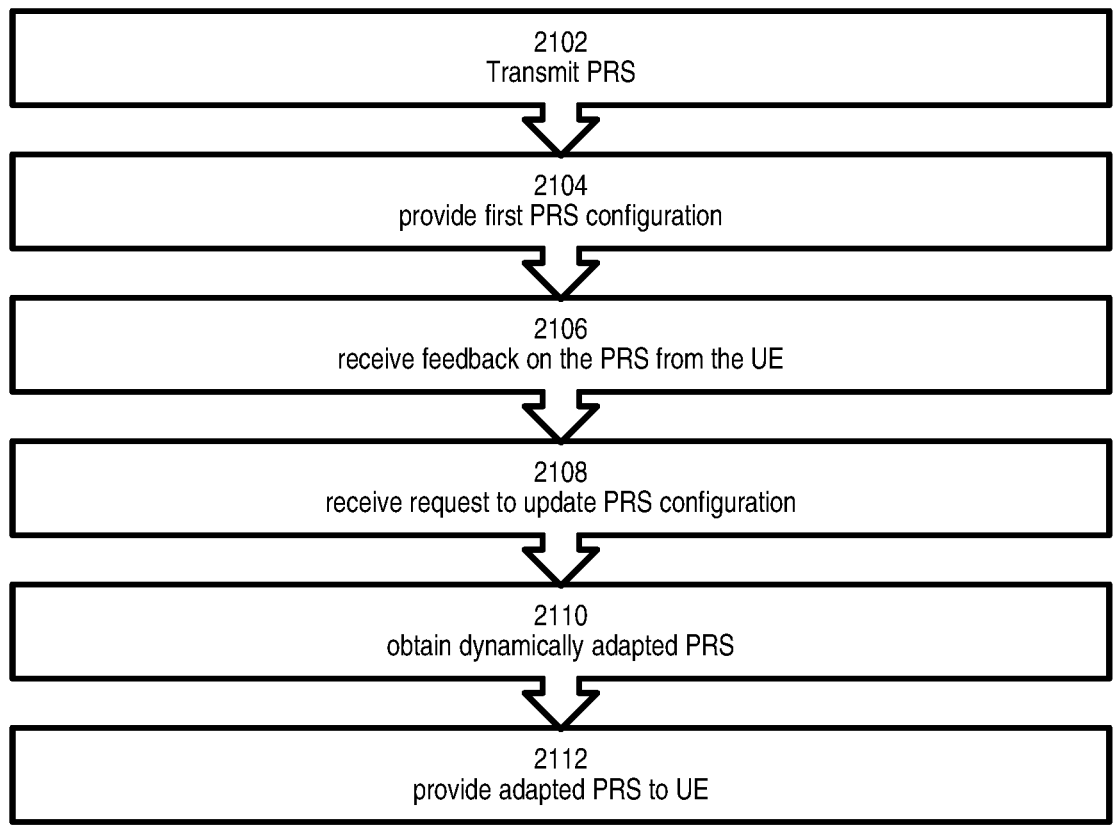
FIG. 21 illustrates a flow diagram of an example method performed by a radio network node, in accordance with certain embodiments.

FIG. 21 illustrates an example method performed at a radio network node, in accordance with particular embodiments. The flowchart illustrates some steps of the method from the perspective of a radio network node (e.g., an eNB). The method may include any of the steps of FIG. 20. The method begins at step 2102 with the network node transmitting one or more PRSs.

At step 2104, the network node provides a first PRS configuration. In some embodiments, steps 2104 and 2102 may be reversed. The PRS configuration may be provided via a wireless connection with the UE. The PRS configuration may be provided via one of on-demand broadcast, broadcast, multicast, or dedicated signaling, or system information.

At step 2106, the network node receives from the UE feedback on the quality of the PRS. The feedback may comprise various measurements of the quality of the PRS. The network node may arrange the measurements on the feedback based on the received cross correlation factors. In some embodiments, the network node may determine that the measurements related to the higher cross correlation factors are prioritized for better positioning accuracy. In some embodiments, the network node may sequentially arrange the measurements in descending order. In some scenarios, the network node may discard one or more measurements. This may be done using the PRS from cells resulting in cross correlation factor worse than a threshold. In some embodiments, the feedback may include the OTDOA. The network node may create or sort the OTDOA of neighboring cell list based upon the feedback received from UE on the PRS quality.

At step 2108, the network node receives a request to update the PRS configuration for one or more UEs.

At step 2110, the network node obtains a dynamically-adapted PRS configuration. The adapted PRS configuration may be obtained from a location node. In some embodiments, the PRS configuration may be received via a receipt of a message from the location node. In some embodiments, the PRS configuration may be obtained through determinations/calculations made by the network node. In some embodiments, the network node may identify the cells that have better cross correlation factors and allocate more PRS resources to the identified cells. In some embodiments, the cells having better cross correlation factors may be those cells whose cross correlation factors are above a threshold or it may be those whose cross correlation factors are in the top "X" percent of cells where "X" is a value between 0% and 100% (e.g., top 25%). In some embodiments, the network node may also allocate bandwidth for the PRS such as in step 2006.

In some embodiments, prior to step 2110, the network node may first determine whether to use a static or dynamic PRS configuration or the combination of both the static part and dynamic part. This determination may be based on factors, such as the total number of UEs in a cell, the number of UEs served by the cell and configured to use PRS of the cell, or the number of UEs served by this or a neighboring cell and configured to use PRS of this cell.

At step 2112, the network node provides the adapted PRS to the UE. Prior to providing the adapted PRS, the network node may first provide the UE with an updated PRS configuration based on the feedback. The updated PRS configuration is different than the first PRS configuration and provides the details for the adapted PRS provided at step 2112.

Figure 22:
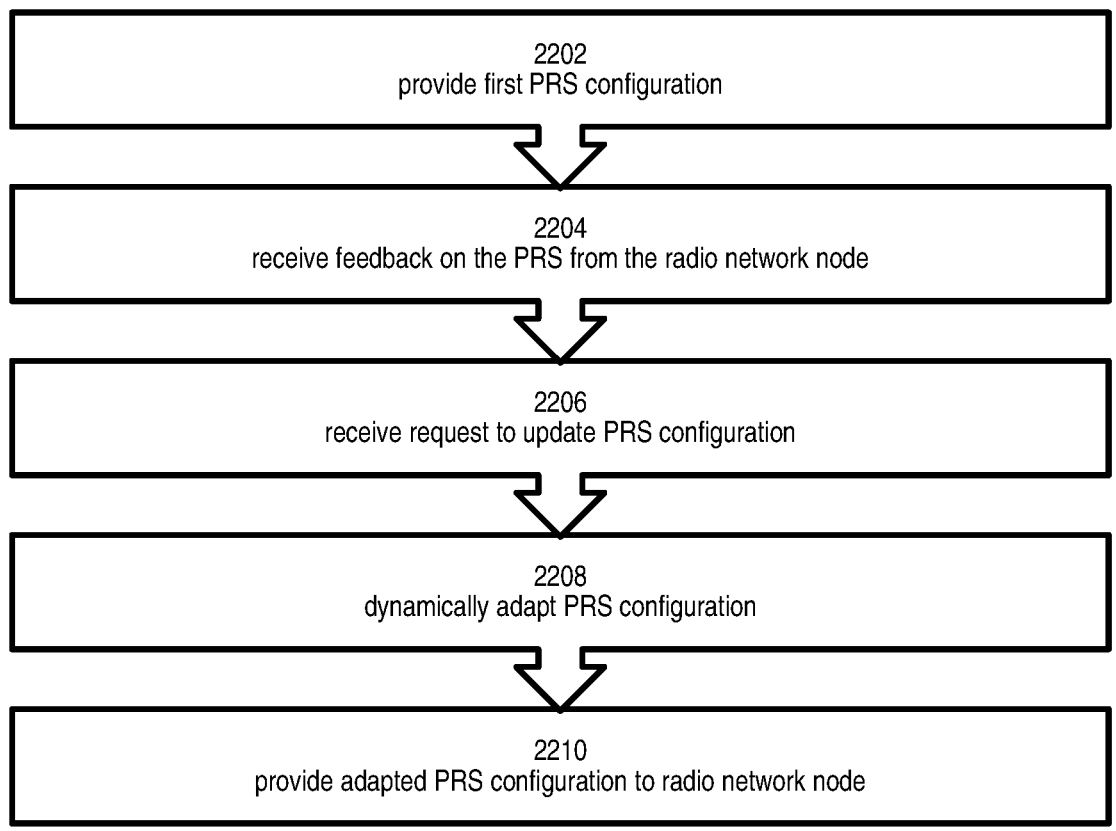
FIG. 22 illustrates a flow diagram of an example method performed by a location network node, in accordance with certain embodiments.

FIG. 22 illustrates an example method performed at a location network node, in accordance with particular embodiments. The flowchart illustrates some steps of the method from the perspective of a location network node. The method may include any of the steps of FIG. 20. The method begins at step 2202 with the network node providing a first PRS configuration. The first PRS configuration may be provided from the location network node to the radio network node, and then to be transmitted from the radio network node to the UE.

At step 2204, the network node receives UE feedback on the PRS from the radio network node. That is the radio network node may receive UE feedback and then forward or transmit that feedback to the location network node. The network node may arrange the measurements in the feedback based on the receive cross correlation factors. The measurements related to the higher cross correlation factors may be prioritized for better positioning accuracy. In some embodiments, the measurements may be sequentially arranged in descending order. In some embodiments, the network node may discard measurements done using (based on) the PRS from cells resulting in cross correlation factor worse than a threshold.

At step 2206, the network node receives a request to update PRS configuration. The request may be for a specific UE or multiple UEs (e.g., all or some of the UEs of a particular cell). The request may have originated from one or more UEs or from the radio network node.

At step 2208, the network node dynamically adapts the PRS configuration. This adapted or updated PRS configuration may be determined based on the feedback from the UE. The updated PRS configuration is different than the first PRS configuration. In some embodiments, the network node may also allocate bandwidth for the PRS such as in step 2006. In some embodiments, the network node may identify the cells that have better cross correlation factors and allocate more PRS resources to the identified cells. In some embodiments, the cells having better cross correlation factors are those that are above a threshold. In some embodiments the cells having better cross correlation factors are the top "X" percent of cells where "X" is a value between 0% and 100%, e.g. 25%.

In some embodiments, the network node may determine whether to use a static or dynamic PRS configuration or a combination of both the static part and dynamic part. The determination may be based on factors, such as the total number of UEs in a cell, the number of UEs served by the cell and configured to use PRS of the cell, or the number of UEs served by this or a neighboring cell and configured to use PRS of this cell.

At step 2210, the network node provides the adapted PRS configuration to the radio network node.

Although not illustrated in FIGS. 20-22, any of these methods may further include obtaining user data and forwarding the user data to a host computer or a UE.

Figure 23:
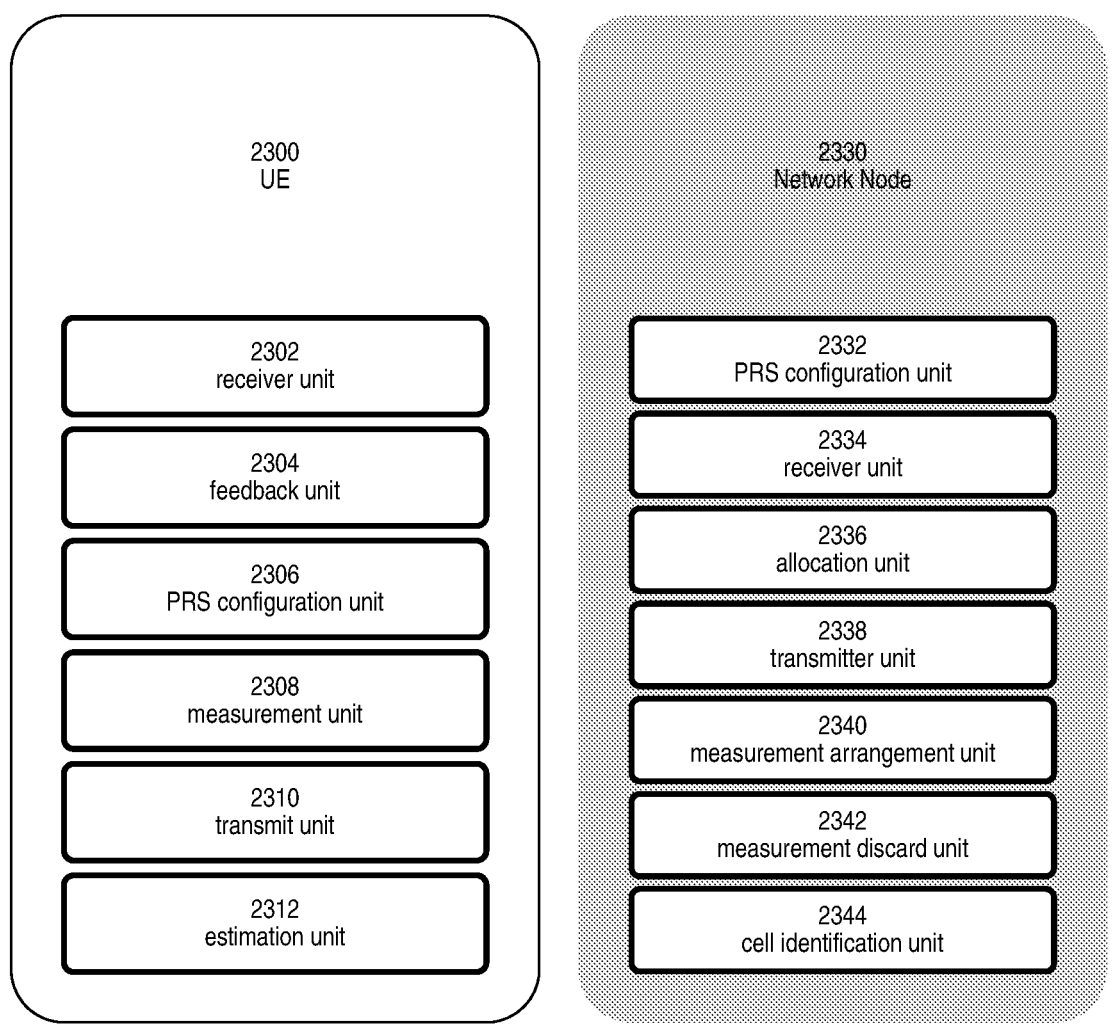
FIG. 23 illustrates an example UE and an example network node, according to certain embodiments, in accordance with certain embodiments.

FIG. 23 illustrates example virtualization apparatuses in network, in accordance with some embodiments. The network comprises a UE 2300 and a network node 2330 that may be used in a wireless network (for example, the wireless network shown in FIG. 10). The UE 2300 and the network node 2330 may be operable to carry out the example methods described with reference to the flowcharts above and possibly any other processes or methods disclosed herein. At least some operations of the method can be performed by one or more other entities.

UE 2300 and network node 2330 may comprise their own separate processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the various illustrated units, and any other suitable units, to perform corresponding functions according one or more embodiments of the present disclosure.

As illustrated in FIG. 23, UE 2300 includes receiver unit 2302, feedback unit 2304, PRS configuration unit 2306, measurement unit 2308, transmit unit 2310, and estimation unit 2312.

Receiver unit 2302 is configured to receive a first PRS as well as additional PRSs transmitted by a first radio node, such as network node 2330. Receiver unit 2302 is also configured to receive a message comprising a PRS configuration. The PRS configuration specifies one or more additional PRSs to be transmitted by the first radio node. The received PRS configuration may specify a PRS that has characteristics different than the first PRS, wherein the characteristics of the one or more additional PRSs are based on the feedback provided to the network node. The PRS configuration may be received via dedicated, multicast, on-demand broadcast or broadcast signaling, or system information.

Feedback unit 2304 is configured to provide feedback to a network node on a quality of the PRS. Feedback unit 2304 may further be configured to include with the feedback information about the environment UE 2300 is located.

PRS configuration unit 2306 is configured to configure UE 2300 to receive the PRS.

Measurement unit 2308 is configured to perform one or more measurements indicative of the quality of the received PRSs.

Transmit unit 2310 is configured to send a request message asking for a PRS that is configured for multiple subframes or occasions. Transmit unit 2310 is also configured to transmit the feedback.

Estimation unit 2312 is configured to estimate one or more time of arrivals for one or more PRSs.

As illustrated in FIG. 23, network node 2330 includes PRS configuration unit 2332, receiver unit 2334, allocation unit 2336, transmitter unit 2338, measurement arrangement unit 2340, measurement discard unit 2342, and cell identification unit 2344. Network node 2330 may be a radio network node, a location network node, or a combination of the two. Although illustrated in a single box, these units may be divided among multiple boxes. For example, network node 2330 maybe a radio base station that has all the units, or it may be a radio base station that has some units while a location node has the other units.

PRS configuration unit 2332 is configured to provide a first PRS configuration for a UE, such as UE 2300. PRS configuration unit 2332 is also configured to provide an updated PRS configuration based on feedback received from the UE. The updated PRS configuration is different than the first PRS configuration. In some embodiments, PRS configuration unit 2332 is configured to determine whether to use a static or dynamic PRS configuration or a combination of both the static part and dynamic part. This may be determined based on factors, such as the total number of UEs in a cell, the number of UEs served by the cell and configured to use PRS of the cell, or the number of UEs served by this or a neighboring cell and configured to use PRS of this cell.

Receiver unit 2334 is configured to receive feedback on the PRS from the UE. In some embodiment, receiver unit 2334 may also be configured to receive a request to assign a PRS configuration to a specific UE.

Allocation unit 2336 is configured to allocate bandwidth for the PRS, wherein bandwidth is allocated to minimize overlap with PRS bandwidth from interfering neighboring cells. In some embodiments, allocating bandwidth may comprise avoiding an overlap in time and frequency with other PRSs.

Transmitter unit 2338 is configured to provide a PRS to the UE. It may also be configured to transmit a PRS configuration. For example, it may transmit the PRS to the UE using one of on-demand broadcast, broadcast, multicast, or dedicated signaling, or system information.

Measurement arrangement unit 2340 is configured to arrange the measurements in the feedback based on the received cross correlation factors. In some embodiments, it may prioritize the measurements related to the higher cross correlation factors for better positioning accuracy. In some embodiments, the measurements may be arranged sequentially in descending order.

Measurement discard unit 2342 is configured to discard measurements from cells resulting in cross correlation factors worse than a threshold.

Cell identification unit 2344 is configured to identify the cells that have better cross correlation factors and to allocate more PRS resources to the identified cells. In some embodiments, the cells having better cross correlation factors are those that are above a threshold. In some embodiments the cells having better cross correlation factors are the top "X" percent of cells, where "X" is a value between 0% and 100%. In some embodiments, cell identification unit 2344 may create or sort a neighboring cell list of the OTDOA based upon the feedback received from UE on the PRS quality.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 24:
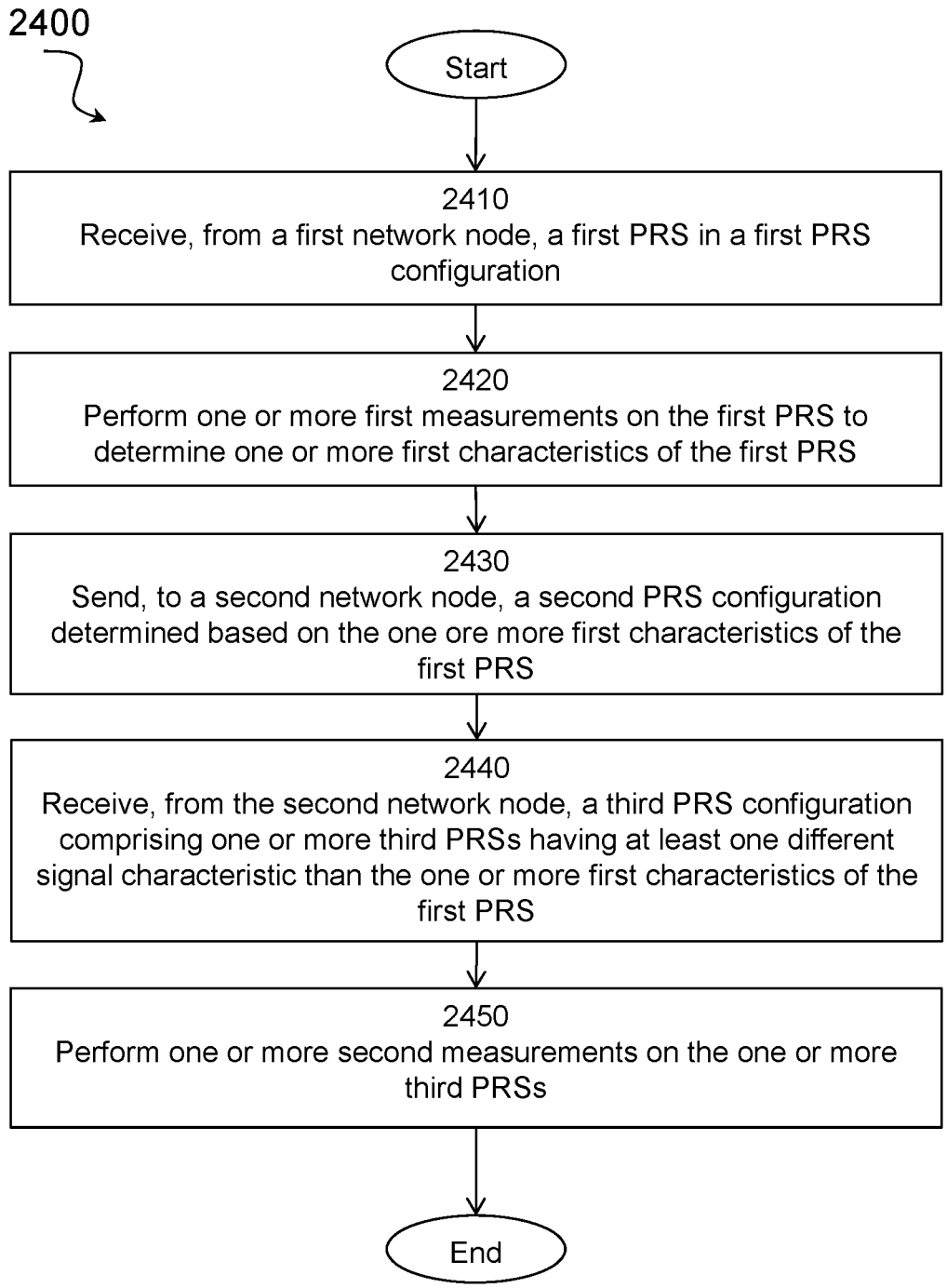
FIG. 24 illustrates a flow diagram of an example method performed at a user equipment, in accordance with certain embodiments.

FIG. 24 illustrates a flow diagram of an example method, in accordance with certain embodiments. The method 1500 may be performed by a UE or a wireless device. The UE may be the wireless device depicted in FIG. 10 or the user equipment shown in FIG. 11. The method 2400 begins at step 2410 with receiving, from a first network node, a first PRS in a first PRS configuration. In some embodiments, the first network node may be the network node shown in FIG. 10. In some embodiments, the first network node may be a base station or a location node.

At step 2420, the method 2400 performs one or more first measurements on the one or more first PRSs to determine one or more first characteristics of the first PRS. In some embodiments, the first measurement may comprise estimates of time of arrivals for the first PRS.

At step 2430, the method 2400 sends, to a second network node, a second PRS configuration determined based on the one or more first characteristics of the first PRS. In some embodiments, the second PRS configuration may comprise one or more second PRSs determined based on the first characteristics of the first PRS. In some embodiments, the second network node may be a base station or a location node. In some embodiments, the second network node is a base station and the first network node is a location node.

At step 2440, the method 2400 further receives, from the second network node, a third PRS configuration comprising one or more third PRSs having at least one different signal characteristic than the one or more first characteristics of the first PRS. In some embodiments, the third PRS configuration may be received via broadcast, multicast, or dedicated signaling, or via on-demand system information broadcast.

At step 2450, the method 2400 further performs one or more second measurements on the one or more third PRSs. In some embodiments, the second measurement may comprise estimates of time of arrivals for the third PRSs. In some embodiments, the method 2400 may determine one or more third characteristics of the one or more third PRSs based on the second PRS configuration.

In some embodiments, the method 2400 further sends, to the first or second network node, a request message. The request message may comprise a request for an additional PRS which is configured for one or more subframes in transmission. The method 2400 further receives, from the first or second network node, the additional PRS determined based on the third PRS configuration. In some embodiments, the additional PRS may be allocated with a bandwidth to avoid an overlap with another PRSs.

Figure 25:
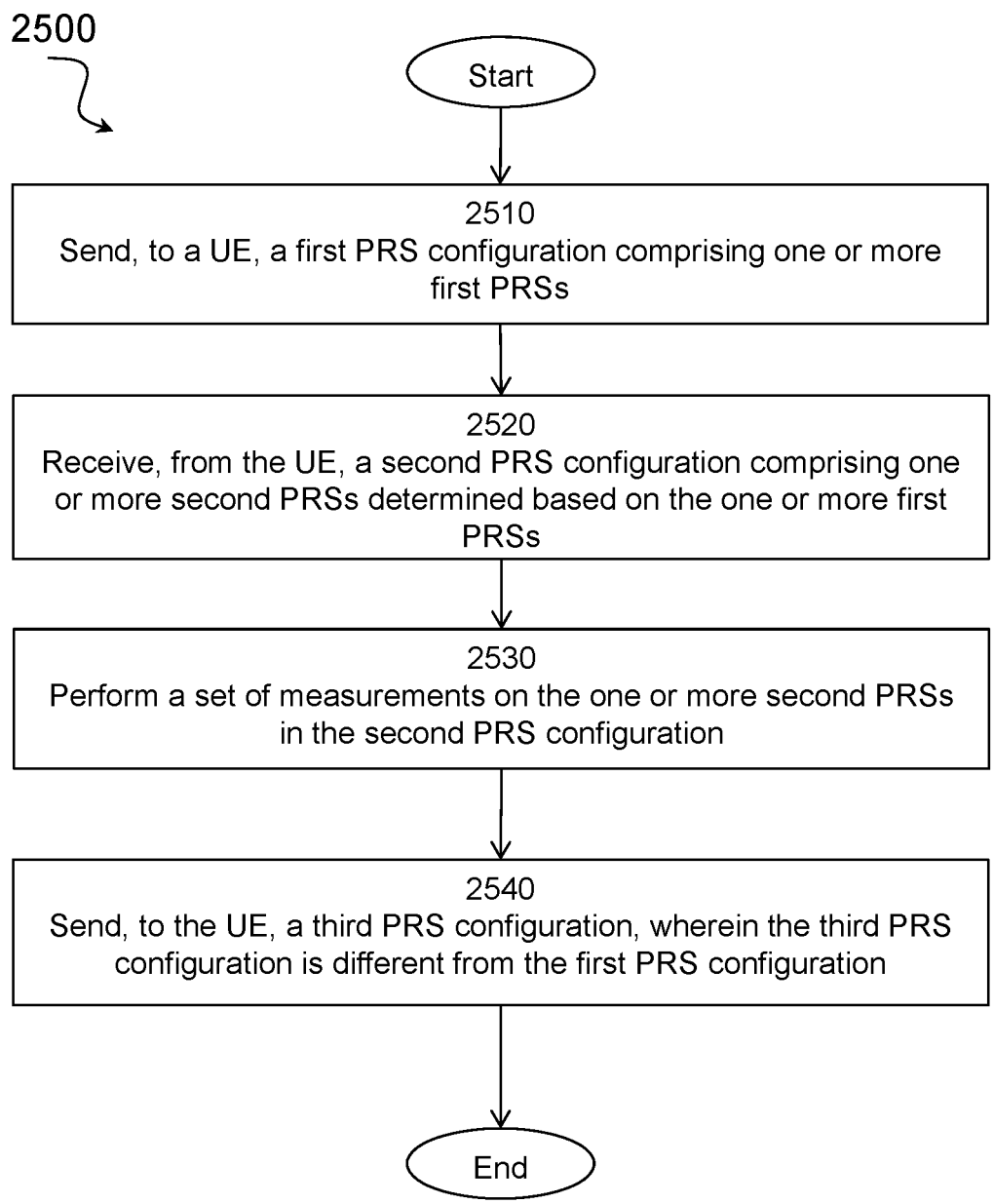
FIG. 25 illustrates a flow diagram of an example method performed at a network node, in accordance with certain embodiments.

FIG. 25 illustrates a flow diagram of another example method, in accordance with certain embodiments. The method may be performed by a network node. The network node may be the network node 1060 depicted in FIG. 10. Method 2500 begins at step 2510 with sending, to a UE, a first PRS configuration comprising one or more first PRSs. In some embodiments, the network node may be a base station or a location node.

At step 2520, the method 2500 receives, from the UE, a second PRS configuration comprising one or more second PRSs determined based on the one or more first PRSs. In some embodiments, the method 2500 receives the second PRS configuration via broadcast, multicast, or dedicated signaling, or via on-demand system information broadcast.

At step 2530, the method 2500 performs a set of measurements on the one or more second PRSs in the second PRS configuration. In some embodiments, the method 2500 may further receive one or more cross correlation factors in the one or more second PRSs, and prioritize one or more measurements related to one or more cross correlation factors which are higher than a threshold from the set of measurements. In some embodiments, the method 2500 may discard one or more measurements related to one or more cross correlation factors which are lower than the threshold from the set of measurements.

In some embodiments, the method 2500 may allocate bandwidth for the third PRS configuration. The bandwidth may be allocated to minimize an overlap from interfering neighboring cells. In another embodiment, the bandwidth may be allocated to avoid an overlap in time and frequency with another PRSs.

In some embodiments, the method 2500 may identify cells which have one or more cross correlation factors higher than a threshold, and allocate bandwidth to the identified cells.

Figure 26:
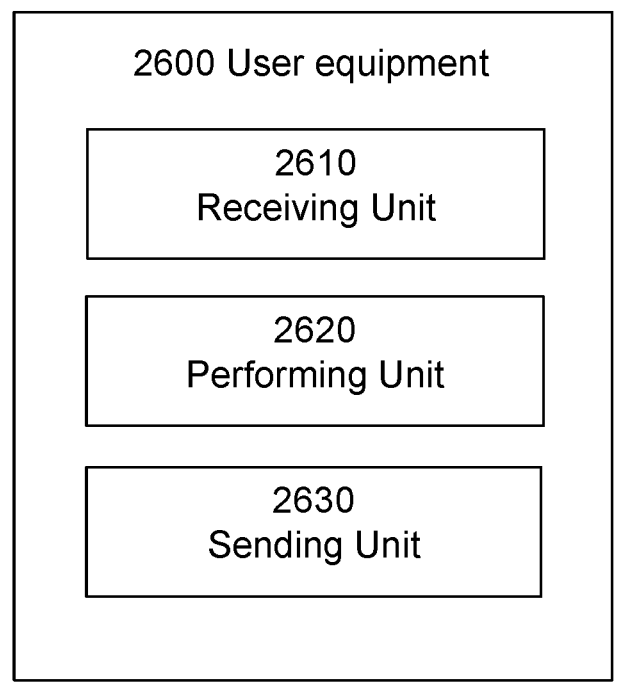
FIG. 26 illustrates a block schematic of an example user equipment and an example network node, in accordance with certain embodiments.

FIG. 26 is a schematic block diagram of an exemplary user equipment 2600, in accordance with certain embodiments. The user equipment 2600 may be used in a wireless network, e.g. the wireless network 1006 shown in FIG. 10. In certain embodiments, the user equipment 2600 may be implemented in a wireless device 1010 shown in FIG. 10. In certain embodiments, the user equipment 2600 may be the UE 1100 shown in FIG. 11. The user equipment 2600 is operable to carry out the example methods described with reference to FIGS. 24 and 25 and possibly any other processes or methods disclosed herein. It is also to be understood that the method in FIGS. 24 and 25 are not necessarily carried out solely by user equipment 2600. At least some operations of the method can be performed by one or more other entities.

User equipment 2600 may comprise processing circuitry, which may include one or more microprocessor or microcontrollers, as well as other digital hardware, which may include digital signal processors (DSPs), special-purpose digital logic, and the like. In some embodiments, the processing circuitry of user equipment 2600 may be the processing circuitry 1020 shown in FIG. 10. In some embodiments, the processing circuitry of user equipment 2600 may be the processor 1101 shown in FIG. 11. The processing circuitry may be configured to execute program code stored in memory 1115 shown in FIG. 11, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2610, performing unit 2620, and sending unit 2630, and any other suitable units of user equipment 2600 to perform corresponding functions according one or more embodiments of the present disclosure, such as a transmitter, a processor, and a receiver.

As illustrated in FIG. 26, the user equipment 2600 includes the receiving unit 2610, the performing unit 2620, and the sending unit 2630. The receiving unit 2610 may be configured to receive, from a first network node, a first PRS in a first PRS configuration. In some embodiments, the first network node may be a network node shown in FIG. 10. In some embodiments, the first network node may be a base station or a location node.

The performing unit 2620 may be configured to perform one or more first measurements on the one or more first PRSs to determine one or more first characteristics of the first PRS. In some embodiments, the first measurement may comprise estimates of time of arrivals for the first PRS.

The sending unit 2630 may be configured to send, to a second network node, a second PRS configuration determined based on the one or more first characteristics of the first PRS. In some embodiments, the second PRS configuration may comprise one or more second PRSs determined based on the first characteristics of the first PRS. In some embodiments, the second network node may be a base station or a location node. In some embodiments, the second network node is a base station and the first network node is a location node.

The receiving unit 2610 may further be configured to receive, from the second network node, a third PRS configuration comprising one or more third PRSs having at least one different signal characteristic than the one or more first characteristics of the first PRS. In some embodiments, the receiving unit 2610 may receive the third PRS configuration via broadcast, multicast, or dedicated signaling, or via on-demand system information broadcast.

The performing unit 2620 may further be configured to perform one or more second measurements on the one or more third PRSs. In some embodiments, the second measurement may comprise estimates of time of arrivals for the third PRSs. In some embodiments, the performing unit 2620 may determine one or more third characteristics of the one or more third PRSs based on the second PRS configuration.

In some embodiments, the sending unit 2630 may further be configured to send, to the first or second network node, a request message. The request message may comprise a request for an additional PRS which is configured for one or more subframes in transmission. The receiving unit 2610 may further be configured to receive, from the first or second network node, the additional PRS determined based on the third PRS configuration. In some embodiments, the additional PRS may be allocated with a bandwidth to avoid an overlap with another PRSs.

Figure 27:
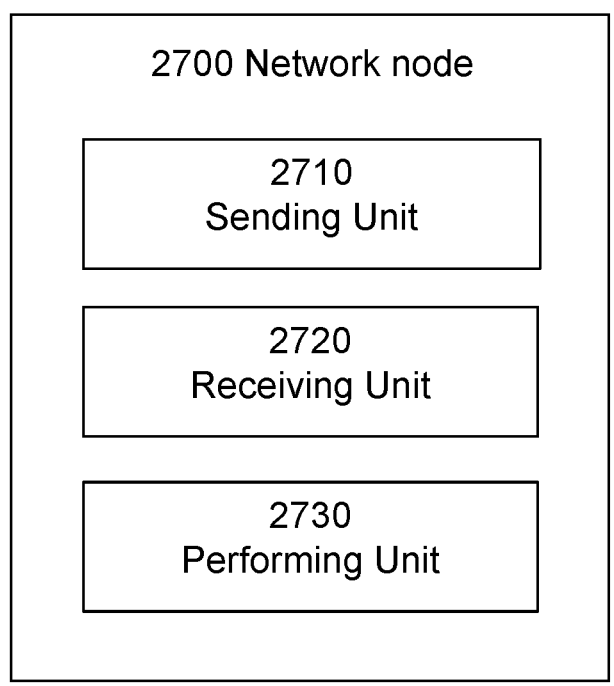
FIG. 27 illustrates a block schematic of an example network node, in accordance with certain embodiments.

FIG. 27 is a schematic block diagram of an exemplary network node 2700 in a wireless network, in accordance with certain embodiments. In some embodiments, the wireless network may be the wireless network 1006 shown in FIG. 10. The network node may be the network node 1060 shown in FIG. 10. The network node 2700 is operable to carry out the example method described with reference to FIGS. 24 and 25 and possibly any other processes or methods disclosed herein. It is also to be understood that the methods in FIGS. 24 and 25 are not necessarily carried out solely by the network node 2700. At least some operations of the method can be performed by one or more other entities.

Network node 2700 may comprise processing circuitry, which may include one or more microprocessor or microcontrollers, as well as other digital hardware, which may include digital signal processors (DSPs), special-purpose digital logic, and the like. In some embodiments, the processing circuitry of the network node 2700 may be the processing circuitry 1070 shown in FIG. 10. The processing circuitry may be configured to execute program code stored in memory, which may include one or several types of memory such as read-only memory (ROM), random-access memory (RAM), cache memory, flash memory devices, optical storage devices, etc.

Program code stored in memory includes program instructions for executing one or more telecommunications and/or data communications protocols as well as instructions for carrying out one or more of the techniques described herein, in several embodiments. In some implementations, the processing circuitry may be used to cause sending unit 2710, receiving unit 2720, performing unit 2730, and any other suitable units of network node 2700 to perform corresponding functions according one or more embodiments of the present disclosure, such as a processor, a receiver, and a transmitter.

As illustrated in FIG. 27, the network node 2700 includes the sending unit 2710, the receiving unit 2720, and the performing unit 2730. The sending unit 2710 may be configured to send, to a UE, a first PRS configuration comprising one or more first PRSs. In some embodiments, the network node 2700 may be a base station or a location node.

The receiving unit 2720 may be configured to receive, from the UE, a second PRS configuration comprising one or more second PRSs determined based on the one or more first PRSs. In some embodiments, the receiving unit 2720 may receive the second PRS configuration via broadcast, multicast, or dedicated signaling, or via on-demand system information broadcast.

The performing unit 2730 may be configured to perform a set of measurements on the one or more second PRSs in the second PRS configuration. In some embodiments, the receiving unit 2720 may receive one or more cross correlation factors in the one or more second PRSs, and the performing unit 2730 may prioritize one or more measurements related to one or more cross correlation factors which are higher than a threshold from the set of measurements, and discard one or more measurements related to one or more cross correlation factors which are lower than the threshold from the set of measurements.

In some embodiments, the performing unit 2730 may further be configured to allocate bandwidth for the third PRS configuration. The bandwidth may be allocated to minimize an overlap from interfering neighboring cells. In another embodiment, the bandwidth may be allocated to avoid an overlap in time and frequency with another PRSs.

In some embodiments, the performing unit 2730 may further be configured to identify cells which have one or more cross correlation factors higher than a threshold, and allocate bandwidth to the identified cells.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is that a network node may constantly perform measurements on the most update PRSs received from a UE, so that the network node may provide a dynamic configuration for each UE in neighboring cells to avoid interferences. Particular embodiments of the present disclosure enable a location node to coordinate with a base station to provide a user-specific, beam-specific PRS configuration for each UE efficiently. Particular embodiments of the present application provide a PRS configuration for a UE based on signal characteristics and UE movements to improve network performance and save energy for devices in the network.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for positioning reference signal configuration, comprising:
 receiving, from a network node, one or more first positioning reference signals (PRSs) in a first PRS configuration;

performing one or more first measurements on the one or more first PRSs to determine one or more first characteristics of the one or more first PRSs;

sending, to the network node, a second PRS configuration comprising one or more second PRSs determined based on the one or more first characteristics of the one or more first PRSs;

receiving, from the network node, a third PRS configuration, wherein the third PRS configuration comprises one or more third PRSs having at least one different signal characteristic than the one or more first characteristics of the first PRS; and performing one or more second measurements on the one or more third PRSs.

2. The method according to claim 1, wherein the one or more first measurements and the one or more second measurements comprise estimates of one or more time of arrivals for the one or more first PRSs and the one or more third PRSs.

3. The method according to claim 1, wherein the third PRS configuration is received via broadcast, multicast, or dedicated signaling, or via on-demand system information broadcast.

4. The method according to claim 1, further comprising determining one or more third characteristics of the one or more third PRSs based on the second PRS configuration.

5. The method according to claim 1, further comprising:
sending, to the network node, a request message, wherein the request message comprises a request for an additional PRS which is configured for one or more subframes in transmission; and
receiving, from the network node, the additional PRS determined based on the third PRS configuration.

6. The method according to claim 5, wherein the additional PRS is allocated with a bandwidth to avoid an overlap with another PRSs.

7. A method or positioning reference signal configuration, comprising:
sending, to a user equipment (UE), one or more first positioning reference signal (PRS) configuration comprising one or more first PRSs;
receiving, from the UE, a second PRS configuration comprising one or more second PRSs determined based on the one or more first PRSs of the first PRS configuration;
performing a set of measurements on the one or more second PRSs of the second PRS configuration; and
sending, to the UE, a third PRS configuration, wherein the third PRS configuration comprises at least one PRS having a different signal characteristic than the one or more first PRSs of the first PRS configuration.

8. The method according to claim 7, wherein the performing step comprises:
receiving one or more cross correlation factors in the one or more second PRSs;
prioritizing one or more measurements related to one or more cross correlation factors which are higher than a threshold from the set of measurements; and
discarding one or more measurements related to one or more cross correlation factors which are lower than the threshold from the set of measurements.

9. The method according to claim 7, wherein the performing step comprises allocating bandwidth for the third PRS configuration.

10. The method according to claim 9, wherein the bandwidth is allocated to minimize an overlap from interfering neighboring cells.

11. The method according to claim 9, wherein the bandwidth is allocated to avoid an overlap in time and frequency with another PRSs.

12. The method according to claim 9, wherein the second PRS configuration is received via broadcast, multicast, or dedicated signaling, or via on-demand system information broadcast.

13. The method according to claim 9, wherein the performing step comprises:
identifying cells which have one or more cross correlation factors higher than a threshold; and
allocating bandwidth to the identified cells.

14. A user equipment for positioning reference signal configuration, comprising:
at least one processing circuitry; and
at least one storage that stores processor-executable instructions, when executed by the processing circuitry, causes a user equipment to:
receive, from a network node, one or more first positioning reference signals (PRSs) in a first PRS configuration;
perform one or more first measurements on the one or more first PRSs to determine one or more first characteristics of the one or more first PRSs;
send, to the network node, a second PRS configuration comprising one or more second PRSs determined based on the one or more first characteristics of the one or more first PRSs;
receive, from the network node, a third PRS configuration, wherein the third PRS configuration comprises one or more third PRSs having at least one different signal characteristic than the one or more first characteristics of the first PRS; and
perform one or more second measurements on the one or more third PRSs.

15. The user equipment according to claim 14, wherein the one or more first measurements and the one or more second measurements comprise estimates of one or more time of arrivals for the one or more first PRSs and the one or more third PRSs.

16. The user equipment according to claim 14, wherein the third PRS configuration is received via broadcast, multicast, or dedicated signaling, or via on-demand system information broadcast.

17. The user equipment according to claim 14, wherein the instructions further cause the UE to determine one or more third characteristics of the one or more third PRSs based on the second PRS configuration.

18. The user equipment according to claim 14, wherein the instructions further cause the UE to:
send, to the network node, a request message, wherein the request message comprises a request for an additional PRS which is configured for one or more subframes in transmission; and
receive, from the network node, the additional PRS determined based on the third PRS configuration.

19. The user equipment according to claim 18, wherein the additional PRS is allocated with a bandwidth to avoid an overlap with another PRSs.

20. A network node for positioning reference signal configuration, comprising:
at least one processing circuitry; and
at least one storage that stores processor-executable instructions, when executed by the processing circuitry, causes a network node to:

send, to a user equipment (UE), one or more first positioning reference signal (PRS) configuration comprising one or more first PRSs;

receive, from the UE, a second PRS configuration comprising one or more second PRSs determined based on the first PRSs of the first PRS configuration;

perform a set of measurements on the one or more second PRSs of the second PRS configuration; and send, to the UE, a third PRS configuration, wherein the third PRS configuration comprises at least one PRS having a different signal characteristic than the one or more first PRSs of the first PRS configuration.

21. The network node according to claim 20, wherein the performing step comprises:

receiving one or more cross correlation factors in the one or more second PRSs;

prioritizing one or more measurements related to one or more cross correlation factors which are higher than a threshold from the set of measurements; and discarding one or more measurements related to one or more cross correlation factors which are lower than the threshold from the set of measurements.

22. The network node according to claim 20, wherein the performing step comprises allocating bandwidth for the third PRS configuration.

23. The network node according to claim 22, wherein the bandwidth is allocated to minimize an overlap from interfering neighboring cells.

24. The network node according to claim 22, wherein the bandwidth is allocated to avoid an overlap in time and frequency with another PRSs.

25. The network node according to claim 20, wherein the second PRS configuration is received via broadcast, multicast, or dedicated signaling, or via on-demand system information broadcast.

26. The network node according to claim 20, wherein the performing step comprises:

identifying cells which have one or more cross correlation factors higher than a threshold; and allocating bandwidth to the identified cells.

* * * * *